United States Patent
Namuduri et al.

(10) Patent No.: US 9,610,845 B2
(45) Date of Patent: Apr. 4, 2017

(54) POWERTRAIN FOR A VEHICLE

(71) Applicant: GM GLOBAL TECHNOLOGY OPERATIONS LLC, Detroit, MI (US)

(72) Inventors: Chandra S. Namuduri, Troy, MI (US); Venkata Prasad Atluri, Farmington Hills, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 14/585,651

(22) Filed: Dec. 30, 2014

(65) Prior Publication Data

US 2016/0185225 A1  Jun. 30, 2016

(51) Int. Cl.
*B60L 3/00* (2006.01)
*B60L 11/12* (2006.01)
(Continued)

(52) U.S. Cl.
CPC ............. *B60L 3/0046* (2013.01); *B60L 1/003* (2013.01); *B60L 7/14* (2013.01); *B60L 11/005* (2013.01);
(Continued)

(58) Field of Classification Search
CPC .. B60L 1/00; B60L 1/003; B60L 1/006; B60L 1/02; B60L 1/14; B60L 1/20; B60L 3/0023; B60L 3/04; B60L 3/0046; B60L 3/0069; B60L 3/0092; B60L 11/00; B60L 11/1877; B60L 11/1851; B60L 11/1853; B60L 11/1855; B60L 11/1864;
(Continued)

(56) References Cited

U.S. PATENT DOCUMENTS

2003/0090235 A1*  5/2003  Tsuji ................... B60L 11/1868
                                                              320/128
2003/0117019 A1*  6/2003  Furukawa ................ B60L 1/02
                                                              307/10.6
(Continued)

FOREIGN PATENT DOCUMENTS

DE          10251589 A1     5/2004
WO           0121445 A1     3/2001

*Primary Examiner* — Thomas G Black
*Assistant Examiner* — Sara Lewandroski
(74) *Attorney, Agent, or Firm* — Quinn IP Law

(57) ABSTRACT

A powertrain includes a first switching device transitionable between an open state disconnecting a first energy storage device from one of a motor-generator and an auxiliary electric system, and a closed state connecting the first energy storage device to one of the motor-generator and the auxiliary electric system. A second switching device is transitionable between an open state disconnecting a second energy storage device from one of the motor-generator and the auxiliary electric system, and a closed state connecting the second energy storage device to one of the motor-generator and the auxiliary electric system. A third switching device is transitionable between an open state disconnecting the auxiliary electric system from one of the motor-generator, and the first and second energy storage devices, and a closed state connecting the auxiliary electric system to one of the motor-generator, and the first and second energy storage devices.

20 Claims, 3 Drawing Sheets

(51) Int. Cl.
    *B60R 16/033*     (2006.01)
    *F02N 11/00*     (2006.01)
    *B60L 1/00*     (2006.01)
    *B60L 7/14*     (2006.01)
    *B60L 11/00*     (2006.01)
    *B60L 11/18*     (2006.01)
    *B60L 15/20*     (2006.01)

(52) U.S. Cl.
    CPC ....... *B60L 11/1861* (2013.01); *B60L 11/1868* (2013.01); *B60L 15/20* (2013.01); *B60L 15/2009* (2013.01); *B60L 15/2054* (2013.01); *F02N 11/006* (2013.01); *B60L 2210/30* (2013.01); *B60L 2210/40* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2240/545* (2013.01); *B60L 2240/547* (2013.01); *B60L 2240/549* (2013.01); *B60L 2240/662* (2013.01); *B60L 2260/26* (2013.01); *B60R 16/033* (2013.01); *Y10S 903/907* (2013.01)

(58) Field of Classification Search
    CPC   B60L 11/1868; B60L 11/1879; F02N 11/003; Y10S 903/00; Y10S 903/902; Y10S 903/903; Y10S 903/907; B60K 6/00; B60K 6/20; B60K 6/28; B60K 1/00; B60K 2028/006; B60K 2001/04; B60K 2001/0405; B60K 2001/0455; B60R 16/033; H02J 7/00; H02J 7/029; H02J 7/0031; H02J 7/0032; H02J 7/0068; H02J 7/18
    See application file for complete search history.

(56) References Cited

U.S. PATENT DOCUMENTS

| | | | |
|---|---|---|---|
| 2012/0169143 A1* | 7/2012 | Nakagawa | B60L 3/0046 307/328 |
| 2012/0235626 A1* | 9/2012 | Oh | H02J 7/0022 320/103 |
| 2015/0021985 A1* | 1/2015 | Matsuda | B60L 11/1877 307/10.1 |
| 2015/0283963 A1* | 10/2015 | Janarthanam | B60K 6/48 307/9.1 |
| 2015/0336461 A1* | 11/2015 | Decoster | B60R 16/03 307/10.1 |
| 2016/0046200 A1* | 2/2016 | Timmons | B60L 11/1855 318/139 |
| 2016/0093456 A1* | 3/2016 | Dulle | H01H 47/002 307/130 |
| 2016/0176298 A1* | 6/2016 | Watson | H01M 2/1072 307/10.6 |

\* cited by examiner

POWERTRAIN FOR A VEHICLE

TECHNICAL FIELD

The present disclosure relates to a powertrain for a vehicle.

BACKGROUND

A vehicle can include an internal combustion engine coupled to a transmission and a final drive to rotate wheels that move the vehicle. To start the engine of a non-hybrid vehicle, a starter motor can be energized which causes a crankshaft of the engine to turn and start the engine.

A hybrid electric vehicle utilizes both an electric motor-generator and an internal combustion engine to offer reduced fuel consumption and emissions. One type of hybrid electric vehicle utilizes a belted-alternator-starter (BAS). The BAS utilizes a motor-generator coupled to a crankshaft of the engine usually by a belt and pulley system. The motor-generator can restart the engine when a brake is released at a stop light and the motor-generator can be rotated by the engine during regenerative braking. This type of hybrid vehicle utilizes a starter motor independent of the motor-generator to start the engine when the engine has been shut off for an extended period of time. The starter motor and the motor-generator operate separately, i.e., not coupleable to each other.

The BAS can be in electrical communication with a first energy storage device. The vehicle can have an electrical system that runs various vehicle accessories such as headlights, HVAC devices, auxiliary motors and entertainment system components. Any current exiting the BAS is fed to the first energy storage device before the current can reach the electrical system, and thus, the electrical system is not powered directly by the BAS.

SUMMARY

A powertrain for a vehicle is provided. The powertrain includes an engine, and a motor-generator that is coupleable to the engine. A starter mechanism is also coupleable to the engine. The powertrain further includes an auxiliary electric system in electrical communication with the motor-generator. A first energy storage device is disposed in a parallel electrical relationship with the motor-generator and the auxiliary electric system. A first switching device is selectively transitionable between a first open state and a first closed state. When disposed in the first open state, the first switching device electrically disconnects the first energy storage device from at least one of the motor-generator and the auxiliary electric system. When disposed in the first closed state, the first switching device electrically connects the first energy storage device to at least one of the motor-generator and the auxiliary electric system. Electrical communication between the motor-generator and the auxiliary electric system is independent of the first switching device being in the first open state and the first closed state. A second energy storage device is disposed in a parallel electrical relationship with the first energy storage device, the motor-generator and the auxiliary electric system. A second switching device is selectively transitionable between a second open state and a second closed state. When disposed in the second open state, the second switching device electrically disconnects the second energy storage device from at least one of the motor-generator and the auxiliary electric system. When disposed in the second closed state, the second switching device electrically connects the second energy storage device to at least one of the motor-generator and the auxiliary electric system. Electrical communication between the motor-generator and the auxiliary electric system is independent of the second switching device being in the second open state and the second closed state. A third switching device is disposed in a serial electrical relationship with the motor-generator and the auxiliary electric system. The third switching device is disposed downstream from the motor-generator, the first energy storage device, and the second energy storage device, along an electrical bus. The third switching device is disposed upstream from the auxiliary electric system along the electrical bus. The third switching device is selectively transitionable between a third open state and a third closed state. When disposed in the third open state, the third switching device electrically disconnects the auxiliary electric system from at least one of the motor-generator, the first energy storage device and the second energy storage device. When disposed in the third closed state, the third switching device electrically connects the auxiliary electric system to at least one of the motor-generator, the first energy storage device, and the second energy storage device.

A method of controlling a powertrain of a vehicle is also provided. The method includes selecting a desired operating mode for the powertrain. A state of charge of each of a first energy storage device and a second energy storage device is sensed with a controller. A fault in one of either the first energy storage device or the second energy storage device is identified, with the controller, such that the identified one of the first energy storage device or the second energy storage device is unavailable to provide energy. The identified one the first energy storage device or the second energy storage device that is unavailable to provide energy is defined as an unavailable energy storage device. The other, non-identified one of the first energy storage device and the second energy storage device that is available to provide energy is defined as an available energy storage device. At least one of a plurality of switching devices, is positioned with the controller, into either a respective open state for disconnecting electrical communication, or a respective closed state to connect electrical communication, to isolate the unavailable energy storage device and provide the selected operating mode with the available energy storage device.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
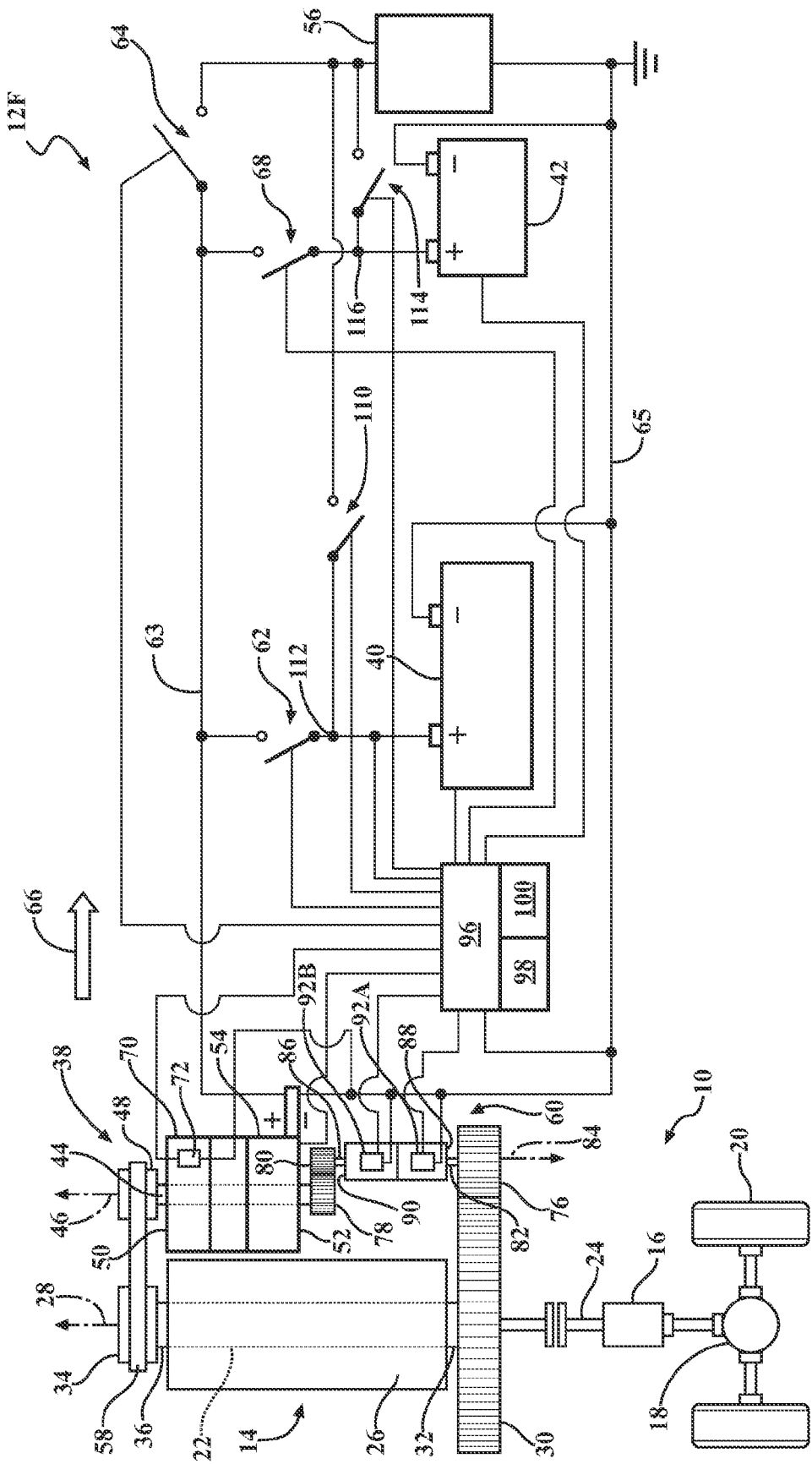
FIG. 1 is a schematic illustration of a vehicle including a powertrain having a first embodiment of a starter mechanism.

Referring to the Figures, wherein like numerals indicate like or corresponding parts throughout the several views, a vehicle is generally shown at 10. A plurality of embodiments of a powertrain 12F, 12G, 12H for the vehicle 10 are generally shown in the Figures. The vehicle 10 that can utilize the powertrain 12F, 12G, 12H can be an automotive vehicle, such as, a car, a truck, etc. It is to be appreciated that the vehicle 10 can alternatively be a non-automotive vehicle, such as, a farm vehicle, a marine vehicle, an aviation vehicle, etc.

Generally, as shown in the Figures, the powertrain 12F, 12G, 12H for each of the embodiments herein can include an engine 14, a transmission 16 and a final drive 18 coupleable to each other to rotate wheels 20 of the vehicle 10 to propel the vehicle 10. The engine 14 can include an output member 22 or crankshaft 22 which is coupleable to an input member 24 of the transmission 16. The transmission 16 can include a gearing arrangement and one or more clutches through which torque is transferred from the output member 22 of the engine 14 to the input member 24 of the transmission 16, then to the final drive 18 and out to the wheels 20 to move the vehicle 10. The wheels 20 can be front wheels or rear wheels of the vehicle 10. The front and/or the rear wheels 20 can be powered by the powertrain 12F, 12G, 12H.

The powertrain 12F, 12G, 12H of each of the embodiments (shown in FIGS. 1-3) includes the engine 14 as discussed above. For example, the engine 14 can be an internal combustion engine. The engine 14 can include a housing 26 and the crankshaft 22 at least partially disposed inside the housing 26. The crankshaft 22 is rotatable about a longitudinal axis 28. In the Figures, the crankshaft 22 is shown schematically without any specific features for illustrative purposes only and it is to be appreciated that the crankshaft 22 can have various configurations to cooperate with other components of the engine 14. The engine 14 can also include a cylinder block, one or more connecting rods, pistons, valves, etc., which will not be discussed further. It is to be appreciated that the engine 14 can be designed to operate on gasoline, diesel fuel, etc.

Figure 2:
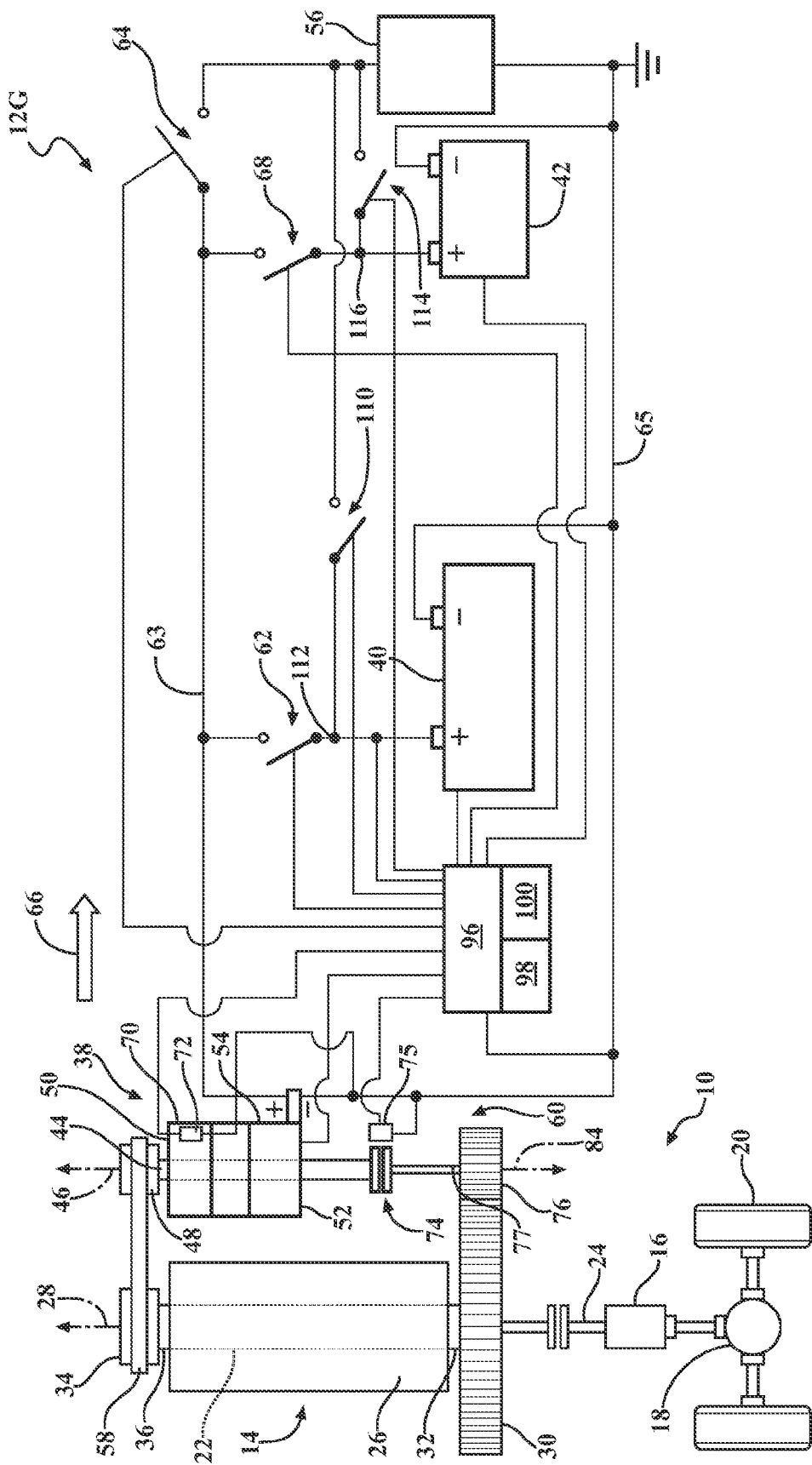
FIG. 2 is a schematic illustration of the vehicle showing a second embodiment of the starter mechanism.
Figure 3:
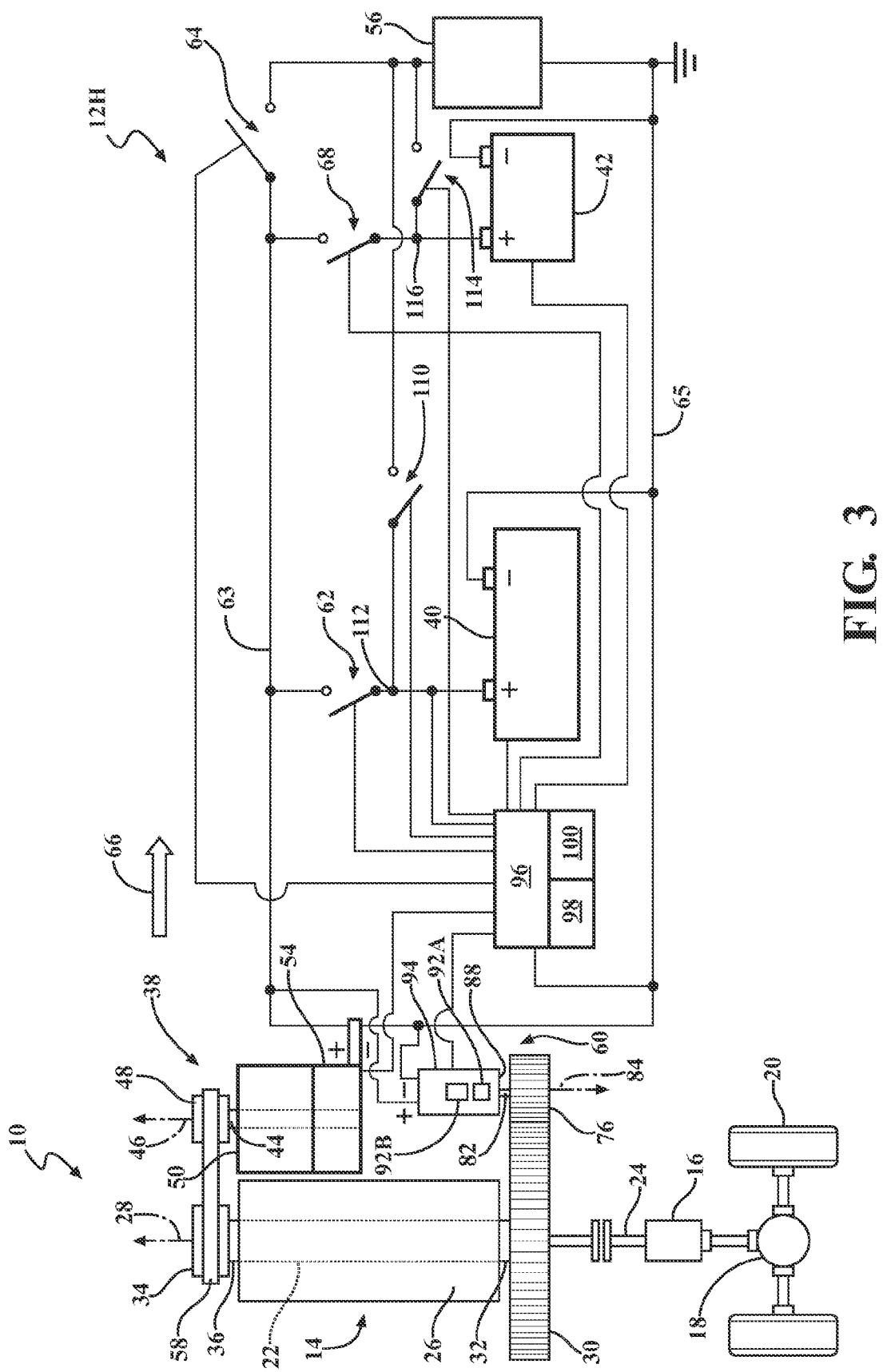
FIG. 3 is a schematic illustration of the vehicle showing a third embodiment of the starter mechanism.

Continuing with FIGS. 1-3, the powertrain 12F, 12G, 12H of each of the embodiments can include a ring gear 30. In certain embodiments, the ring gear 30 is disposed outside of the housing 26. The ring gear 30 is attached to a first distal end 32 of the crankshaft 22 such that the ring gear 30 and the crankshaft 22 are rotatable in unison about the longitudinal axis 28. Simply stated, the ring gear 30 and the crankshaft 22 can rotate as a unit about the longitudinal axis 28.

Additionally, the powertrain 12F, 12G, 12H of each of the embodiments (see FIGS. 1-3) can include a rotatable element 34, such as a crankshaft pulley 34, which is rotatable about the longitudinal axis 28. In certain embodiments, the crankshaft pulley 34 is disposed outside of the housing 26 of the engine 14. The crankshaft pulley 34 is coupleable to a second distal end 36 of the crankshaft 22 such that the crankshaft pulley 34 and the crankshaft 22 can be rotatable in unison about the longitudinal axis 28. Specifically, coupleable can include when the crankshaft pulley 34 is directly coupled to the crankshaft 22 or indirectly coupled to the crankshaft 22 by the operation of another mechanism, such as clutching, as discussed further below. Generally, the first and second distal ends 32, 36 of the crankshaft 22 are spaced from each other along the longitudinal axis 28. It is to be appreciated that one or more bearings can rotatably support the crankshaft 22. It is to also be appreciated that the rotatable element 34 can be a sprocket, etc., instead of a pulley.

Furthermore, the powertrain 12F, 12G, 12H of each of the embodiments (see FIGS. 1-3) includes a motor-generator 38 coupleable to the engine 14. For example, the motor-generator 38 can be coupled to the outside of the housing 26 of the engine 14 and/or supported by any suitable component adjacent to the engine 14. The motor-generator 38 can be supported by any suitable methods, such as fasteners, brackets, braces, etc. The motor-generator 38 can operate as a motor or as a generator. The powertrain 12F, 12G, 12H can be referred to as a hybrid powertrain because the powertrain 12F, 12G, 12H utilizes the motor-generator 38 which can assist in reducing fuel consumption and emissions of the vehicle 10. For example, in certain embodiments, the motor-generator 38 can be utilized as a motor to start the engine 14 or as a torque assist which provides torque to the crankshaft 22 to assist in propelling the vehicle 10 when the vehicle 10 is moving (utilizing an endless rotatable device 58 discussed below). As another example, the motor-generator 38 can be utilized as a generator to generate current, i.e., electricity, or recharge a first energy storage device 40 and/or a second energy storage device 42, as discussed further below. When the motor-generator 38 is generating current/electricity, the current can drive various auxiliary devices of the vehicle 10, which is also discussed further below.

One suitable motor-generator 38 is a brushless electric motor-generator. Additionally, the motor-generator 38 can be an alternating current (AC) motor-generator or any other suitable motor-generator. For example, at least for the powertrain 12F, 12G embodiments of FIGS. 1 and 2, torque being outputted from the AC motor-generator 38 can be from about 15.0 newton meter (Nm) to about 25.0 Nm. As another example, at least for the powertrain 12F, 12G embodiments of FIGS. 1 and 2, the torque being outputted from the AC motor-generator 38 can be from about 15.0 Nm to about 20.0 Nm. The motor-generator 38, for the embodiments of FIGS. 1, 2 and 5, provides reduced maximum torque requirement, (as compared, for example, to a BAS as discussed in the background section), which allows the mass size of the motor-generator 38 to be decreased and also allows reduced power requirements of the motor-generator 38. It is to be appreciated that the torque being outputted from the motor-generator 38 can be values other than identified above. For example, for the powertrain 12H of the embodiment shown in FIG. 3, the torque being outputted from the AC motor-generator 38 can be greater than 25.0 Nm.

As shown in the Figures, the motor-generator 38 can include a motor/generator shaft 44 that can be rotatable about a first axis 46. In certain operations, when the motor/generator shaft 44 rotates, torque can be transferred to the crankshaft 24 as discussed further below. Furthermore, the motor/generator shaft 44 does not move along the first axis 46. Additionally, the first axis 46 is spaced from the longitudinal axis 28. In certain embodiments, the first axis 46 and the longitudinal axis 28 are spaced from each other and substantially parallel to each other. Therefore, the motor/generator shaft 44 and the crankshaft 22 are offset from each other. It is to be appreciated that the motor/generator shaft 44 can be split into more than one piece, e.g., more than one piece to accommodate the operation of one or more clutches, etc.

Continuing with FIGS. 1-3, the motor-generator 38 can include a rotatable element 48, such as a motor/generator pulley 48, being coupleable to the motor/generator shaft 44 adjacent to a first end 50 of the motor-generator 38. Specifically, the motor/generator pulley 48 can be disposed outside of the first end 50 of the motor-generator 38. The motor/generator pulley 48 can also be rotatable about the first axis 46. For certain operations, the motor/generator shaft 44 and the motor/generator pulley 48 can rotate in unison about the first axis 46. In other operations, the motor/generator shaft 44 and the motor/generator pulley 48 are not rotatable in unison, i.e., rotatable separately or one rotatable while the other remains stationary (does not rotate). Coupleable can include when the motor/generator pulley 48 is directly coupled to the motor/generator shaft 44 or indirectly coupled to the motor/generator shaft 44 by the operation of another mechanism, such as clutching, as discussed further below.

In certain embodiments, the motor/generator shaft 44 can extend out of a second end 52 of the motor-generator 38. Generally, the first and second ends 50, 52 of the motor-generator 38 are spaced from each other along the first axis 46. Specifically, the motor-generator 38 can include a housing having the first and second ends 50, 52. Therefore, the motor/generator shaft 44 is at least partially disposed inside the housing of the motor-generator 38. It is to be appreciated that one or more bearings can rotatably support the motor/generator shaft 44. It is to also be appreciated that the rotatable element 48 can be a sprocket, etc., instead of a pulley.

The motor-generator 38 of each of these powertrain 12F, 12G, 12H embodiments can include a stator and a rotor spaced from the stator. The rotor is attached to the motor/generator shaft 44 such that the rotor and the motor/generator shaft 44 are rotatable in unison about the first axis 46 relative to the stator. Simply stated, the rotor and the motor/generator shaft 44 are rotatable as a unit about the first axis 46 while the stator remains stationary. The stator is in electrical communication with the first and/or second energy storage devices 40, 42. For example, when the motor-generator 38 is functioning as the motor, current stored in the first and/or second energy storage devices 40, 42 can be supplied to the stator/rotor to cause rotation of the rotor and ultimately start the engine 14 for the embodiments of FIGS. 1 and 2, and in certain situations, can start the engine 14 for the embodiment of FIG. 3. As another example, for all of the embodiments herein, when the motor-generator 38 is functioning as the generator, torque from the rotor rotating about the first axis 46 is converted into electrical current which can be stored in the first and/or second energy storage devices 40, 42 for later use.

The motor-generator 38 can operate in various modes to perform various functions. For example, the motor-generator 38 can operate in a generating mode to generate current by rotating the rotor of the motor-generator 38 relative to the stator of the motor-generator 38. Simply stated, the motor-generator 38 can operate as a generator when in the generating mode. The generating mode can occur when the vehicle 10 is motoring at a certain speed and is not braking/slowing down the vehicle 10. As another example, the motor-generator 38 can operate in a torque assist mode to provide torque to the wheels 20 of the vehicle 10 (utilizing an endless rotatable device 58 discussed below). Simply stated, the motor-generator 38 can operate as a motor when in the torque assist mode. As yet another example, the motor-generator 38 can operate in a regenerative braking mode to generate current during braking, i.e., slowing down, of the vehicle 10 by rotating the rotor of the motor-generator 38 relative to the stator of the motor-generator 38. Simply stated, the motor-generator 38 can operate as a generator when in the regenerative braking mode.

Referring to FIGS. 1-3, the motor-generator 38 of each of these embodiments can also include an electrical device that can include an integrated power inverter 54. The stator can be in electrical communication with the integrated power inverter 54, and the integrated power inverter 54 can be selectively in electrical communication with the first and/or second energy storage devices 40, 42. The integrated power inverter 54 can convert direct current (DC) provided by the first and/or second energy storage devices 40, 42 to alternating current (AC) to power the motor-generator 38 to function as the motor. Furthermore, the integrated power inverter 54 can convert AC to DC to be stored in the first and/or second energy storage devices 40, 42 when the motor-generator 38 functions as the generator. Additionally, the integrated power inverter 54 can convert AC to DC to supply current to an auxiliary electric system 56. Also, the integrated power inverter 54 can convert AC to DC to selectively supply current to the first and/or second energy storage devices 40, 42. Generally, the integrated power inverter 54 can be in electrical communication with the stator to operate the motor-generator 38 as the motor or as the generator. The motor-generator 38 can include other electrical devices, such as one or more sensors (such as for example, a motor position sensor that detects the position of the motor/generator shaft 44), controllers, fans to cool electrical components, etc. Furthermore, the integrated power inverter can include one or more brushes, one or more brush holders, a field control electronic device when using a wound field machine, etc.

Continuing with FIGS. 1-3, each of the embodiments of the powertrain 12F, 12G, 12H can further include an endless rotatable device 58, i.e., a device having no ends, disposed about the crankshaft pulley 34 and the motor/generator pulley 48. Specifically, the endless rotatable device 58 is disposed about the crankshaft pulley 34 and the motor/generator pulley 48 to transfer rotational movement between the crankshaft pulley 34 and the motor/generator pulley 48. In other words, the endless rotatable device 58 is disposed about the crankshaft pulley 34 and the motor/generator pulley 48 to selectively transfer torque between the crankshaft 22 and the motor/generator shaft 44. For example, in certain operations, rotation of the motor/generator pulley 48 by the endless rotatable device 58 can correspondingly rotate the motor/generator shaft 44, etc.

In certain embodiments, the endless rotatable device 58 is a belt. The belt can be a ribbed belt, a flat belt or any other suitable configuration. The motor-generator 38 can be coupled to the engine 14 by the endless rotatable device 58. Specifically, the motor-generator 38 can be coupled to the crankshaft 22 of the engine 14 by the endless rotatable device 58 and the pulleys 34, 48. In certain embodiments, the endless rotatable device 58 can be a chain instead of the belt and sprockets can be utilized with the chain instead of the pulleys 34, 48.

Referring to the Figures, the powertrain 12F, 12G, 12H of each of the embodiments also includes a starter mechanism 60 coupleable to the engine 14. The starter mechanism 60 can be various configurations. The starter mechanism 60 can be in one configuration as shown in FIG. 1. Alternatively, the starter mechanism 60 can be in another configuration as shown in FIG. 2. Yet another alternative, the starter mechanism 60 can be in another configuration as shown in FIG. 3. The starter mechanism 60 for each of the embodiments can include a first starter gear 76 and each of the configurations of the starter mechanism 60 are discussed in detail below. The starter mechanism 60 is coupleable to the engine 14 through engagement of the first starter gear 76 with the ring gear 30 as also discussed below. Furthermore, the motor-generator 38 may be coupleable to the engine 14 through the starter mechanism 60.

Furthermore, the powertrain 12F, 12G, 12H of each of the embodiments can include the auxiliary electric system 56 in electrical communication with the motor-generator 38. The auxiliary electric system 56 can include one or more accessory devices of the vehicle 10. For example, the auxiliary electric system 56 can include headlights, HVAC devices, auxiliary motors, entertainment system components, etc. In certain embodiments, the integrated power inverter 54 is in electrical communication with the auxiliary electric system 56 to convert AC produced by the motor-generator 38 to DC. Therefore, the DC can be utilized by the auxiliary electric system 56 to power various accessories.

Continuing with FIGS. 1-3, the powertrain 12F, 12G, 12H of each of the embodiments include the first energy storage device 40, which is disposed in a parallel electrical relationship with the motor-generator 38 and the auxiliary electric system 56. In other words, the first energy storage device 40 is disposed in a parallel circuit arrangement with the motor-generator 38 and the auxiliary electric system 56. The first energy storage device 40 can be any suitable battery or other device that can store current for later use.

The powertrain 12F, 12G, 12H of each of the embodiments also include a first switching device 62 selectively transitionable between a first open state to electrically disconnect the first energy storage device 40 from at least one of the motor-generator 38 and the auxiliary electric system 56, and a first closed state to electrically connect the first energy storage device 40 to at least one of the motor-generator 38 and the auxiliary electric system 56. Therefore, electrical communication between the motor-generator 38 and the auxiliary electric system 56 is independent of the first switching device 62 being in the first open and closed states. Therefore, the location of the first switching device 62 does not interfere with the electrical communication between the motor-generator 38 and the auxiliary electric system 56. In other words, the motor-generator 38 and the auxiliary electric system 56 can be in electrical communication with each other independently of which state the first switching device 62 is in. The first energy storage device 62 is disposed between an electrical bus 63 and an electrical ground 65, and the first switching device 62 is disposed between the first energy storage device 62 and the electrical bus 63 such that the first energy storage device 62 is in direct electrical communication with the electrical bus 63 when the first switching device 62 is in the first closed state. The electrical bus 63 can be a high-voltage DC bus and/or a low-voltage DC bus.

The phrase "at least one of" as used herein should be construed to include the non-exclusive logical "or", i.e., at least one of the motor-generator 38 or the auxiliary electric system 56. Therefore, in certain embodiments, the first energy storage device 40 is in electrical communication with the motor-generator 38 or the auxiliary electric system 56. In other embodiments, the first energy storage device 40 is in electrical communication with both of the motor-generator 38 and the auxiliary electric system 56.

In general, for embodiments of the powertrain 12F, 12G, 12H, the first switching device 62 is used to selectively block the flow of current to the first energy storage device 40. When the first switching device 62 is in the first closed state, the electrical circuit to the first energy storage device 40 is completed or closed and current can flow to or from the first energy storage device 40. When the first switching device 62 is in the first open state, the electrical circuit is separated or open and current cannot flow to or from the first energy storage device 40. The first open state is shown in solid lines in the Figures and the first closed state is shown as dashed lines in the Figures.

The first switching device 62 for all of these embodiments of the powertrain 12F, 12G, 12H can be a unidirectional blocking switch or a bidirectional blocking switch. In one configuration, the first switching device 62 is a solid-state switch. The first switching device 62 can be a binary switch, a contact switch, a relay switch, etc. The first switching device 62 is schematically illustrated in the Figures for illustrative purposes only and should not be construed as any particular type of switch.

The powertrain 12F, 12G, 12H for the embodiments of FIGS. 1, 2, and 3, includes the second energy storage device 42 disposed in a parallel electrical relationship with the first energy storage device 40, the motor-generator 38 and the auxiliary electric system 56. In other words, the second energy storage device 42 is disposed in a parallel circuit arrangement with the motor-generator 38 and the auxiliary electric system 56.

Generally, the first energy storage device 40 is a high-voltage energy storage device, and the second energy storage device 42 is a low-voltage energy storage device that is in electrical communication with the auxiliary electric system 56. The first energy storage device 40 is utilized to selectively supply current/voltage to the motor-generator 38 and the second energy storage device 42 is utilized to selectively supply current/voltage to the auxiliary electric system 56. The first energy storage device 40 and second energy storage devices 42 can be any suitable battery or other device that can store current or energy for later use. One non-limiting example is that the high-voltage energy storage device can be a 48 volt DC battery and the low-voltage energy storage device can be a 12 volt DC battery. Another non-limiting example is the high-voltage energy storage device can be a 24-48 volt DC multi-cell rechargeable lithium ion battery or an ultracapacitor, while the low-voltage energy storage device can be a 12 volt DC lead acid or lithium ion battery. As yet another example, the first and second energy storage devices 40, 42 can have substantially the same voltage levels.

Furthermore, the embodiments of the powertrain 12F, 12G, 12H shown in FIGS. 1, 2 and 3 include a second switching device 68 selectively transitionable between a second open state to electrically disconnect the second energy storage device 42 from at least one of the motor-generator 38 and the auxiliary electric system 56, and a second closed state to electrically connect the second energy storage device 42 to at least one of the motor-generator 38 and the auxiliary electric system 56. Electrical communication between the motor-generator 38 and the auxiliary electric system 56 is independent of the second switching device 68 being in the second open and closed states. Therefore, the location of the second switching device 68 does not interfere with the electrical communication between the motor-generator 38 and the auxiliary electric system 56. In other words, the motor-generator 38 and the auxiliary electric system 56 can be in electrical communication with each other independently of which state the second switching device 68 is in. The second energy storage device 42 is disposed between the electrical bus 63 and the electrical ground 65, and the second switching device 68 is disposed between the second energy storage device 42 and the electrical bus 63 such that the second energy storage device 42 is in direct electrical communication with the electrical bus 63 when the second switching device 68 is in the second closed state. Therefore, due to the location of the first and second switching devices 62, 68, current can selectively flow to/from the first and second energy storage devices 40, 42 independently of each other.

As discussed above, the phrase "at least one of" should be construed to include the non-exclusive logical "or", i.e., at least one of the motor-generator 38 or the auxiliary electric system 56. Therefore, in certain embodiments, the second energy storage device 42 is in electrical communication with the motor-generator 38 or the auxiliary electric system 56. In other embodiments, the second energy storage device 42 is in electrical communication with both of the motor-generator 38 and the auxiliary electric system 56.

Generally, the second switching device 68 is used to selectively block the flow of current to the second energy storage device 42. When the second switching device 68 is in the second closed state, the electrical circuit to the second energy storage device 42 is completed or closed and current can flow to or from the second energy storage device 42. When the second switching device 68 is in the second open state, the electrical circuit is separated or open and current cannot flow to or from the second energy storage device 42. The second open state is shown in solid lines in FIGS. 1, 2, and 3 and the second closed state is shown as dashed lines in FIGS. 1, 2, and 3.

The second switching device 68 can be a unidirectional blocking switch or a bidirectional blocking switch. In one configuration, the second switching device 68 is a solid-state switch. The second switching device 68 can be a binary switch, a contact switch, a relay switch, etc. The second switching device 68 is schematically illustrated in these Figures for illustrative purposes only and should not be construed as any particular switch.

The powertrain 12F, 12G, 12H of each of the embodiments includes a third switching device 64 disposed downstream from the motor-generator 38, the first energy storage device 40, and the second energy storage device 42, along the electrical bus 63. Furthermore, in these embodiments, the third switching device 64 is disposed upstream from the auxiliary electric system 56 along the electrical bus 63. Downstream as used herein is the direction flowing from the motor-generator 38 toward the auxiliary electric system 56 along the electrical bus 63. Upstream as used herein is the direction opposite downstream, and is generally described as the direction flowing from the auxiliary electric system 56 toward the motor-generator 38 along the electrical bus 63. The arrow 66, in each of the Figures, points in the downstream direction. It should be appreciated that the upstream direction is opposite of arrow 66. Generally, the third switching device 64 is disposed in a series electrical relationship, i.e., a series circuit arrangement, with the motor-generator 38 and the auxiliary electric system 56. The third switching device can be a binary switch, a contact switch, a relay switch, etc.

The powertrain 12F, 12G, 12H of each of the embodiments includes a fourth switching device 110. The fourth switching device 110 is selectively transitionable between a fourth open state and a fourth closed state. When disposed in the fourth open state, the fourth switching device 110 is operable to electrically disconnect the first energy storage device 40 from the auxiliary electric system 56. When disposed in the fourth closed state, the fourth switching device 114 is operable to electrically connect the first energy storage device 40 to the auxiliary electric system 56. Electrical communication between the first energy storage device 40 and the auxiliary electric system 56 through the fourth switching device 110 is independent of the first switching device 62 being in either the first open state or the first closed state. The fourth switching device 110 is electrically connected to the first energy storage device 40 at a first electrical connection 112 disposed between the first energy storage device 40 and the first switching device 62. The fourth switching device 110 can be a binary switch, a contact switch, a relay switch, a uni-directional blocking switch, etc.

The powertrain 12F, 12G, 12H of each of the embodiments includes a fifth switching device 114. The fifth switching device 114 is selectively transitionable between a fifth open state and a fifth closed state. When disposed in the fifth open state, the fifth switching device 114 is operable to electrically disconnect the second energy storage device 42 from the auxiliary electric system 56. When disposed in the fifth closed state, the fifth switching device 114 is operable to electrically connect the second energy storage device 42 to the auxiliary electric system 56. Electrical communication between the second energy storage device 42 and the auxiliary electric system 56 through the fifth switching device 114 is independent of the second switching device 68 being in the second open state and the second closed state. The fifth switching device 114 is electrically connected to the second energy storage device 42 at a second electrical connection 116 disposed between the second energy storage device 42 and the second switching device 68. The fifth switching device 114 can be a binary switch, a contact switch, a relay switch, a uni-directional blocking switch, etc.

In the embodiments 12F, 12G of FIGS. 1 and 2, the motor-generator 38 can include a motor/generator clutch 70 selectively disconnecting rotation between the motor/generator pulley 48 and the motor/generator shaft 44. The motor/generator pulley 48 is coupleable to the motor/generator shaft 44 through the selective operation of the motor/generator clutch 70. Therefore, the motor/generator pulley 48 is selectively coupled to the motor/generator shaft 44 through the operation of the motor/generator clutch 70. The motor/generator clutch 70 can be disposed adjacent to the motor/generator pulley 48 or adjacent to the first end 50 of the motor-generator 38. Actuation of the motor/generator clutch 70 allows various operations of the motor-generator 38 without transferring rotation between the crankshaft pulley 34 and the motor/generator pulley 48 by the endless rotatable device 58. The motor/generator clutch 70 can include a solenoid 72 to selectively actuate the motor/generator clutch 70. It is to be appreciated that the motor/generator clutch 70 can be any suitable type of clutch.

Turning to the powertrain 12F embodiment of FIG. 1, the motor-generator 38 and the starter mechanism 60 are selectively geared to each other to start the engine 14. Specifically, the motor-generator 38 and the starter mechanism 60 are selectively geared to each other to transfer torque from the motor-generator 38 through the starter mechanism 60 to the crankshaft 22 to start the engine 14. The motor-generator 38 and the starter mechanism 60 can be geared to each other in various configurations, and FIG. 1 is an example of one suitable configuration. In this embodiment, the starter mechanism 60 can include the first starter gear 76 selectively engaging the ring gear 30 to selectively rotate the ring gear 30 and the crankshaft 22 to start the engine 14. Specifically, the starter mechanism 60 does not include a separate motor to rotate the first starter gear 76. Instead, rotation of the first starter gear 76 is provided by the motor-generator 38 to start the engine 14. In other words, the motor-generator 38 can be operated as a motor to turn the first starter gear 76 to start the engine 14. Therefore, for all starts of the engine 14 (for the embodiment of FIG. 1), whether a short period of time (such as when the engine 14 has been shut off at a stop light, etc.) or an extended period of time (such as when the engine 14 has been shut off overnight, etc.), the motor-generator 38 operates to rotate the first starter gear 76 to start the engine 14.

Continuing with the embodiment of FIG. 1, the motor-generator 38 can include a motor/generator gear 78 attached to a distal end of the motor/generator shaft 44 such that the motor/generator gear 78 and the motor/generator shaft 44 are rotatable in unison about the first axis 46. Generally, the motor/generator gear 78 can be disposed outside of the second end 52 of the motor-generator 38. As discussed above, the motor/generator pulley 48 can be disposed outside of the first end 50 of the motor-generator 38. Therefore, the motor/generator pulley 48 is disposed adjacent to one end of the motor-generator 38 and the motor/generator gear 78 is disposed adjacent to another end of the motor-generator 38. For example, the motor/generator pulley 48 and the motor/generator gear 78 can be spaced from each other at opposite ends of the motor-generator 38.

Furthermore, in the embodiments of FIGS. 1 and 2, the starter mechanism 60 can include a second starter gear 80 coupleable to the motor/generator gear 78 such that the starter mechanism 60 and the motor-generator 38 are selectively geared to each other to transfer torque from the motor/generator shaft 44 through the first starter gear 76. The second starter gear 80 can move back and forth to selectively engage the motor/generator gear 78 to selectively transfer rotation from the motor/generator shaft 44 to the starter mechanism 60. Similarly, the first starter gear 76 can move back and forth to selectively engage the ring gear 30 to selectively transfer rotation from the motor/generator shaft 44 to the first starter gear 76.

Additionally, the starter mechanism 60, of FIG. 1, can include a first shaft 82 having the first starter gear 76 attached thereto. In this embodiment, the first shaft 82 and the first starter gear 76 are rotatable in unison about a second axis 84. Generally, the first and second axes 46, 84 can be spaced and substantially parallel to each other. In addition, in this embodiment, the first shaft 82 and the first starter gear 76 move along the second axis 84 in unison. In other words, the first shaft 82 and the first starter gear 76 are rotatable about and movable along the second axis 84 as a unit. In this embodiment, the motor/generator shaft 44 and the first shaft 82 are offset from each other. It is to be appreciated that one or more bearings can rotatably support the first shaft 82.

Continuing with the embodiment of FIG. 1, the starter mechanism 60 can also include a second shaft 86 having the second starter gear 80 attached thereto. In this embodiment, the second shaft 86 and the second starter gear 80 are rotatable in unison about the second axis 84. Additionally, in this embodiment, the second shaft 86 and the second starter gear 80 are movable along the second axis 84 in unison. In other words, the second shaft 86 and the second starter gear 80 can rotate about and move along the second axis 84 as a unit. The first and second starter gears 76, 80 can move along the second axis 84 in opposite directions, and thus, the first and second shafts 82, 86 can correspondingly move in opposite directions.

The first shaft 82 extends outwardly from a first end 88 of the starter mechanism 60 and the second shaft 86 extends outwardly from a second end 90 of the starter mechanism 60. Specifically, the starter mechanism 60 can include a housing having the first and second ends 88, 90. Therefore, the first starter gear 76 can be disposed outside the first end 88 of the starter mechanism 60 and the second starter gear 80 can be disposed outside the second end 90 of the starter mechanism 60. Simply stated, the first starter gear 76 is disposed adjacent to one end of the starter mechanism 60 and the second starter gear 80 is disposed adjacent to another end of the starter mechanism 60. For example, the first and second starter gears 76, 80 can be spaced from each other at opposite ends of the starter mechanism 60.

When the motor-generator 38 is actuated to start the engine 14, the first and second starter gears 76, 80 move into engagement with the ring gear 30 and the motor/generator gear 78 respectively, which thus provides concurrent rotation of the first and second shafts 82, 86, the first and second starter gears 76, 80, the motor/generator shaft 44 and the motor/generator gear 78 to rotate the ring gear 30 and the crankshaft 22 to start the engine 14. When the first starter gear 76 engages the ring gear 30 and the second starter gear 80 engages the motor/generator gear 78 torque is transferred from the motor/generator shaft 44 through the first and second starter gears 76, 80, and corresponding shafts 82, 86, and the ring gear 30 to the crankshaft 22 to start the engine 14. In this embodiment, the motor/generator shaft 44 and the second shaft 86 are offset from each other, while the first and second shafts 82, 86 are spaced from each other along the second axis 84. In other words, the first and second shafts 82, 86 can be concentric along the second axis 84.

The starter mechanism 60 can also include an intermediate shaft coupled to the first and second shafts 82, 86 between the first and second starter gears 76, 80 such that the intermediate shaft can rotatably couple the first and second shafts 82, 86 together. In other words, the first and second shafts 82, 86 remain in engagement with the intermediate shaft when the first and second shafts 82, 86 move back and forth along the second axis 84. The intermediate shaft can be any suitable configuration to allow the first and second shafts 82, 86 to move along the second axis 84 while also rotatably coupling the first and second shafts 82, 86 together. For example, the first and second shafts 82, 86 can move along the second axis 84 inside the intermediate shaft, and the intermediate shaft and the first and second shafts 82, 86 can be splined or be any other suitable configuration to cooperate with each other. It is to be appreciated that one or more bearings can rotatably support the second shaft 86 and/or the intermediate shaft. The first starter gear 76 can be coupleable to the motor/generator shaft 44 through engagement of various shafts and/or selective engagement of gears discussed above.

In certain embodiments, the first and second starter gears 76, 80 can move in tandem. Therefore, for example, the first starter gear 76 can move into engagement with the ring gear 30 before the second starter gear 80 moves into engagement with the motor/generator gear 78, and alternatively, the second starter gear 80 can move into engagement with the motor/generator gear 78 before the first starter gear 76 moves into engagement with the ring gear 30. In other embodiments, the first and second starter gears 76, 80 can move simultaneously into engagement with the ring gear 30 and the motor/generator gear 78 respectively.

Continuing with FIG. 1, the starter mechanism 60 can also include at least one linear actuator 92. For the embodiment of FIG. 1, a plurality of linear actuators 92A, 92B are be utilized. The linear actuator 92A can be selectively energized to move the first starter gear 76 along the second axis 84. The linear actuator 92A can be various configurations, and non-limiting examples can include a solenoid, an electric motor driving a ball-screw mechanism, a shape-memory alloy actuator, an electro-active polymer actuator, etc. For the shape-memory alloy actuator, selectively energizing the material, such as the alloy, can change the shape of the material which causes the first starter gear 76 to move along the second axis 84. For the electro-active polymer actuator, selectively energizing the material, such as the polymer, can change the shape of the material to move the first starter gear 76 along the second axis 84.

The operation of the linear actuator 92A is detailed below utilizing the solenoid example. Generally, the solenoid can be utilized to move the first starter gear 76 along the second axis 84. The solenoid can be disposed inside, outside or partially outside of the starter mechanism 60, or can be in any other suitable location. For FIG. 1, one solenoid (e.g., linear actuator 92A) can be utilized to selectively move the first shaft 82 and the first starter gear 76, and another solenoid (e.g., linear actuator 92B) can be utilized to selectively move the second shaft 86 and the second starter gear 80.

The solenoid can include a coil selectively magnetized and a core attracted to the coil when the coil is magnetized. When the core is coupled to the first starter gear 76, the core is selectively attracted to the coil. When the core is attracted to the coil, the first starter gear 76 can move into engagement with the ring gear 30. Therefore, the coil remains stationary while the core is selectively movable. It is to be appreciated that the solenoid can be other configurations than discussed above. For example, the coil can be concentric or eccentric about the second axis 84, or the coil can be disposed at one side. The core can be formed of a ferromagnetic material or any other suitable material that can be attracted to the coil when the coil is magnetized.

Furthermore, for the solenoid configuration of the linear actuator 92, the starter mechanism 60 can include at least one return mechanism to move the first starter gear 76 back along the second axis 84. For example, when the solenoid is energized, the first starter gear 76 can move to engage the ring gear 30, and when the solenoid is de-energized, the return mechanism can move the first starter gear 76 out of engagement with the ring gear 30.

The return mechanism can include a biasing member to bias the first starter gear 76 back along the second axis 84. The biasing member can be a coil spring or any other suitable biasing member to move the first starter gear 76. It is to be appreciated that one or more shoulders can be coupled to the first starter gear 76 and the inside of the starter mechanism 60 to provide reaction surfaces for the biasing member to move the first starter gear 76 back along the second axis 84. It is to also be appreciated that the return mechanism can alternatively be electronically actuated.

Another suitable configuration of the starter mechanism 60 can be a single shaft having the first starter gear 76 attached to one end and the second starter gear 80 attached to another end. In other words, the two separate shafts 82, 86 (as discussed above) are eliminated and a single shaft is utilized, and in this configuration, one linear actuator 92 can be utilized. In another suitable configuration of the starter mechanism 60, the second starter gear 80 can remain in engagement with the motor/generator gear 78 while only the first starter gear 76 is able to move back and forth along the second axis 84; and in this embodiment, one linear actuator 92 can be utilized. Yet another suitable configuration of the starter mechanism 60 is the second starter gear 80 is eliminated and only the first starter gear 76 is utilized, with the first starter gear 76 movable to engage and disengage from both the motor/generator gear 78 and the ring gear 30; and in this configuration, one linear actuator 92 can be utilized. In yet another configuration of the starter mechanism 60, the motor/generator gear 78, the second shaft 86 and the second starter gear 80 are eliminated, with the first shaft 82 and the motor/generator shaft 44 being concentric with each other, and the first starter gear 76 movable along the motor/generator shaft 44 to engage and disengage the ring gear 30.

For these other embodiments, the first starter gear 76 can be coupleable to the motor/generator shaft 44 through various shafts and/or selective/continuous engagement of gears. Furthermore, for all of the embodiments, coupleable can include selective coupling of various components and/or continuous coupling of various components.

Turning specifically to the powertrain 12G embodiment of FIG. 2, the starter mechanism 60 is further defined as a starter clutch 74. In this embodiment, the motor/generator clutch 70 can be disposed between the motor/generator pulley 48 and the starter clutch 74 to selectively disconnect rotation between the motor/generator pulley 48 and the motor/generator shaft 44. The starter clutch 74 can include a solenoid 75 to selectively actuate the starter clutch 74. It is to be appreciated that the starter clutch 74 can be a one-way clutch, a hydraulic clutch, an electromechanical clutch or any other suitable type of clutch. The starter clutch 74 can be utilized in a one energy storage device 40 embodiment or a two energy storage device 40, 42 embodiment.

Furthermore, in this embodiment (FIG. 2), the starter mechanism 60 can include the first starter gear 76 coupleable to the starter clutch 74. The first starter gear 76 is coupleable to the starter clutch 74 through the selective operation of the starter clutch 74. The first starter gear 76 continuously engages the ring gear 30 to rotate the ring gear 30 and the crankshaft 22 when starting the engine 14. The first starter gear 76 can be attached to a shaft 77 such that the first starter gear 76 and the shaft 77 can rotate in unison. The starter clutch 74 is disposed between the motor-generator 38 and the first starter gear 76 to selectively disconnect rotation between the first starter gear 76 and the motor-generator 38. The starter clutch 74 is disposed between the motor-generator 38 and the first starter gear 76 to selectively transfer torque from the motor-generator 38 through the first starter gear 76 and the ring gear 30 to the crankshaft 22. For example, the starter clutch 74 can be disposed adjacent to the second end 52 of the motor-generator 38. Therefore, the motor/generator pulley 48 is disposed adjacent to one end of the motor-generator 38 and the starter clutch 74 is disposed adjacent to another end of the motor-generator 38. Specifically, the starter clutch 74 can be disposed between the motor/generator shaft 44 and the shaft 77. The starter clutch 74 is coupleable to the motor/generator shaft 44 to selectively transfer torque from the motor/generator shaft 44 through the first starter gear 76 and the ring gear 30 to the crankshaft 22. Therefore, the motor/generator shaft 44 and the first starter gear 76 are selectively coupled to each other through the operation of the starter clutch 74.

Actuation of the starter clutch 74 connects rotation of the motor/generator shaft 44 with the first starter gear 76, which in turn rotates the ring gear 30 to turn the crankshaft 22 to start the engine 14. As such, torque is transferred from the rotating motor/generator shaft 44 through the first starter gear 76 and the ring gear 30 to the crankshaft 22 to start the engine 14. Once the engine 14 is started, the starter clutch 74 disconnects rotation of the motor/generator shaft 44 and the first starter gear 76 such that the motor/generator shaft 44 can operate independently of the first starter gear 76. In this embodiment, the starter clutch 74 does not include a separate motor to rotate the first starter gear 76 to start the engine 14. Instead, rotation of the first starter gear 76 is provided by the motor-generator 38 when the starter clutch 74 is actuated. In other words, the motor-generator 38 can be operated as a motor to turn the first starter gear 76 when the starter clutch 74 is actuated to start the engine 14. Therefore, for all starts of the engine 14 (for the embodiment of FIG. 2), whether a short period of time (such as when the engine 14 has been shut off at a stop light, etc.) or an extended period of time (such as when the engine 14 has been shut off overnight, etc.), the motor-generator 38 operates to rotate the first starter gear 76 to start the engine 14.

Turning to the powertrain 12H for the embodiment of FIG. 3, the starter mechanism 60 operates independently of the motor-generator 38 to selectively start the engine 14. In other words, the motor-generator 38 does not assist the starter mechanism 60 to start the engine 14, and thus, the starter mechanism 60 can exclusively start the engine 14. In other words, the starter mechanism 60 does not utilize the motor-generator 38 as the motor to rotate the first starter gear 76. Generally, the motor/generator clutch 70 can be eliminated in this embodiment. The starter mechanism 60 starts the engine 14 when the engine 14 has been shut off for an extended period of time (such as overnight) or been shut off for a short period of time (such as shut off at a stop light, etc.). The motor-generator 38 is coupled to the engine 14 through the endless rotatable device 58 and not through the starter mechanism 60 as other embodiments.

For the embodiment of the powertrain 12H shown in FIG. 3, if the motor-generator 38 has sufficient torque output and sufficient mechanical advantage through the endless rotatable device 58, then the motor-generator 38 can start, or assist in starting, the engine 14, such as restarts at a stop light. Therefore, generally, in the embodiment of FIG. 3, the motor-generator 38 operates as a torque assist or as a generator. When the motor-generator 38 is in the torque assist mode, the motor-generator 38 can operate as a motor to provide additional torque to the wheels 20. Furthermore, the motor-generator 38 can operate as a generator in the generating mode or the regenerative braking mode.

Continuing with the embodiment of FIG. 3, the starter mechanism 60 can include a motor 94 and the first starter gear 76 engagable with the ring gear 30 to selectively rotate the ring gear 30 to transfer toque to the crankshaft 22. The first starter gear 76 is coupled to the motor 94 of the starter mechanism 60 such that the motor 94 selectively rotates the first starter gear 76. Therefore, the starter mechanism 60 operates independently of the motor-generator 38.

The starter mechanism 60 can include a linear actuator 92A to move the first starter gear 76 along the second axis 84 into and out of engagement with the ring gear 30. Therefore, the starter mechanism 60 is coupled to the engine 14 when the first starter gear 76 engages the ring gear 30. The linear actuator 92A can be various configurations, and non-limiting examples can include a solenoid, an electric motor driving a ball-screw mechanism, a shape-memory alloy actuator, an electro-active polymer actuator, etc. For the shape-memory alloy actuator, selectively energizing the material, such as the alloy, can change the shape of the material which causes the first starter gear 76 to move along the second axis 84. For the electro-active polymer actuator, selectively energizing the material, such as the polymer, can change the shape of the material to move the first starter gear 76 along the second axis 84. The starter mechanism 60 may further include a rotational actuator 92B that is operable to engage rotation of the first starter gear 76 about the second axis 84. The rotational actuator 92B may include, for example, a switch or solenoid.

The powertrain 12F, 12G, 12H of each of the embodiments can further include a controller 96, which can be part of an electronic control module that is in communication with various components of the vehicle 10. Generally, the controller 96 signals various components of the vehicle 10 to selectively operate, some of which are discussed below. It is to be appreciated that more than one controller 96 can be utilized.

The controller 96 includes a processor 98 and a memory 100 on which is recorded instructions for communicating with the motor-generator 38, the starter mechanism 60, the first and/or second energy storage devices 40, 42, the first, second, third, fourth, and/or fifth switching devices 62, 64, 68, 110, 114. The controller 96 is configured to execute the instructions from the memory 100, via the processor 98. For example, the controller 96 can be a host machine or distributed system, e.g., a computer such as a digital computer or microcomputer, acting as a vehicle control module, and/or as a proportional-integral-derivative (PID) controller device having a processor, and, as the memory 100, tangible, non-transitory computer-readable memory such as read-only memory (ROM) or flash memory. The controller 96 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 96 can include all software, hardware, memory 100, algorithms, connections, sensors, etc., necessary to monitor and control the motor-generator 38, the starter mechanism 60, the first, second, third, fourth, and/or fifth switching devices 62, 64, 68, 110, 114. Furthermore, the controller 96 can include all software, hardware, memory 100, algorithms, connections, sensors, etc., necessary to monitor the first and/or second energy storage devices 40, 42. As such, a control method can be embodied as software or firmware associated with the controller 96. It is to be appreciated that the controller 96 can also include any device capable of analyzing data from various sensors, comparing data, making the necessary decisions required to control and monitor the motor-generator 38, the starter mechanism 60, the first, second, third, fourth, and/or fifth switching devices 62, 64, 68, 110, 114, as well as monitor the first and/or second energy storage devices 40, 42.

For the embodiments of FIGS. 1-3, the controller 96 is in communication with the motor-generator 38, the starter mechanism 60, the first switching device 62, the second switching device 68, the third switching device 64, the fourth switching device 110, and the fifth switching device 114 to selectively operate the motor-generator 38, the starter mechanism 60, the first switching device 62, the second switching device 68, the third switching device 64, the fourth switching device 110, and the fifth switching device 114. For all of these embodiments, the controller 96 selectively signals the different switching devices 62, 64, 68, 110, 114 to establish one of either an open state or a closed state. Additionally, the controller 96 may signal actuators of the starter mechanism 60 (e.g., 92A, 92B), or the motor/generator clutch 70 to establish either an actuated position or an un-actuated position, to achieve the desired operation, such as the generating mode, the torque assist mode, the regenerative braking mode, a cold-engine start mode, an auto-engine start mode, etc.

Furthermore, the controller 96 can be in communication with the first energy storage device 40. When the first switching device 62 is in the first closed state, current can flow into the first energy storage device 40 or flow out of the first energy storage device 40, and the controller 96 can monitor the amount of current in the first energy storage device 40. Additionally, the controller 96 can be in communication with the integrated power inverter 54.

The controller 96 is also in communication with the second energy storage device 42, and with the second switching device 68 to selectively signal the second switching device 68 to establish one of the second open state and the second closed state. Therefore, depending on the desired operation, the controller 96 signals the second switching device 68 to be in one of the second open state and the second closed state. When the second switching device 68 is in the second closed state, current can flow into the second energy storage device 42 or flow out of the second energy storage device 42, and the controller 96 can monitor the amount of current in the second energy storage device 42.

The controller 96 for the embodiments of FIGS. 1-3 receives current from the first energy storage device 40. Specifically, the controller 96 remains in electrical communication with the first energy storage device 40 independently of which state the first switching device 62 is in. In other words, the electrical connection to the controller 96 is disposed between the first energy storage device 40 and the first switching device 62 such that current can continuously flow to the controller 96 without being affected by the state that the first switching device 62 is in.

The architecture of the different embodiments of the powertrain 12F, 12G, 12H allows the powertrain to provide several different operating modes, even if one of either the first energy storage device 40 or the second energy storage device 42 if unavailable. Due to the unique architecture of the powertrain 12F, 12G, 12H, the engine 14 can be started from power provided from either the first energy storage device 40 or the second energy storage device 42. Further, due to the connections provided by the fourth switching device 110 and the fifth switching device 114, load voltage stabilization to the auxiliary electric system is possible, even during auto starts.

A method of controlling the powertrain 12F, 12G, 12H described above is also provided. The method includes selecting a desired operating mode for the powertrain 12F, 12G, 12H. The desired operating mode may include, but is not limited to an engine_idle_off mode, a key_start mode, an auto start mode, a torque assist mode, a regen_mode, an auto_stop mode, a sailing mode, a recharge mode. Each of the above noted modes may include several different variations. The different possible modes are presented in the tables below, along with the conditions required to enter/exit the respective modes, and the position of the different switching devices and actuators.

Once a desired operating mode is selected, the controller 96 may sense a state of charge of each of the first energy storage device 40 and the second energy storage device 42. The controller 96 may also sense an ambient temperature and/or a temperature of the first and second energy storage device 42s. The controller 96 uses the sensed information related to the state of charge and the temperature of each of the first and second energy storage device 42s to determine and/or identify the existence of a fault in one of either the first energy storage device 40 or the second energy storage device 42. A fault in either the first energy storage device 40 or the second energy storage device 42 is defined herein respectively as anything that makes either the first energy storage device 40 or the second energy storage device 42 unable to provide energy to the powertrain 12F, 12G, 12H. For example, a fault may be identified because an energy storage device is below an acceptable state of charge.

If the controller 96 does not identify a fault in either of the first energy storage device 40 or the second energy storage device 42, then the controller 96 may control the powertrain 12F, 12G, 12H in a normal manner, as is shown in the tables below. However, if the controller 96 identifies a fault in one of the first energy storage device 40 or the second energy storage device 42, the controller 96 may define the identified one the first energy storage device 40 or the second energy storage device 42 that is unavailable to provide energy as an unavailable energy storage device. The controller 96 may also define the other, non-identified one of the first energy storage device 40 and the second energy storage device 42, which is available to provide energy, as an available energy storage device. For example, if the controller 96 determines that the first energy storage device 40 is faulty, the controller 96 defines the first energy storage device 40 as the unavailable energy storage device and defines the second energy storage device 42 as the available energy storage device. Alternatively, if the controller 96 determines that the second energy storage device 42 is faulty, the controller 96 defines the second energy storage device 42 as the unavailable energy storage device, and defines the first energy storage device 40 as the available energy storage device.

Once the controller 96 has defined the unavailable energy storage device and the available energy storage device, the controller 96 signals the different switching devices and/or actuators to move the switching devices and the actuators into their required positions for the specific selected operating mode. The controller 96 positions the different switching devices into either their required open state or closed state to isolate the unavailable energy storage device, and provide the powertrain 12F, 12G, 12H with power to achieve the selected operating mode with energy from the available energy storage device.

For example, if the controller 96 determines that the first energy storage device 40 is faulty, the controller 96 defines the first energy storage device 40 as the unavailable energy storage device and defines the second energy storage device 42 as the available energy storage device. The controller 96 then signals to position the first switching device 62 into the first open state and the fourth switching device 110 into the fourth open state. Positioning the first switching device 62 and the fourth switching device 110 into their respective open states isolates the first energy storage device 40, i.e., the unavailable energy storage device. Once the unavailable energy storage device is isolated, the controller 96 signals the remaining switching devices to direct energy to the required component of the drivetrain for the selected operating mode. For example, when the selected operating mode includes one of an engine 14 starting mode or a charging mode for charging the second energy storage device 42, the controller 96 signals to position the second switching device 68 into the second closed state, thereby connecting the second energy storage device 42 with the starter mechanism and/or motor generator. When the selected operating mode does not include one of the engine 14 starting mode or the charging mode for charging the second energy storage device 42, the controller 96 signals to position the second switching device 68 into the second open state to electrically disconnect the second energy storage device 42 from the motor-generator. In order to provide power to the auxiliary electric system when the first energy storage device 40 is the unavailable energy storage device, the controller 96 power the auxiliary electric system with power from either the motor-generator, or from the second energy storage device 42. In order to power the auxiliary electric system with power from the motor-generator, the controller 96 signals to position the third switching device 64 into the third closed state and position the fifth switching device 114 into the fifth open state, thereby isolating the second energy storage device 42 from the auxiliary electric system and connecting the motor-generator to the auxiliary electric system. In order to power the auxiliary electric system with power from the second energy storage device 42, the control signals to position the third switching device 64 into the third open state and position the fifth switching device 114 into the fifth closed state, thereby connecting the second energy storage device 42 and the auxiliary electric system, and isolating the auxiliary electric system from the motor-generator.

In another example, if the controller 96 determines that the second energy storage device 42 is faulty, the controller 96 defines the second energy storage device 42 as the unavailable energy storage device and defines the first energy storage device 40 as the available energy storage device. The controller 96 then signals to position the second switching device 68 into the second open state and the fifth switching device 114 into the fifth open state. Positioning the second switching device 68 and the fifth switching device 114 into their respective open states isolates the second energy storage device 42, i.e., the unavailable energy storage device. Once the unavailable energy storage device is isolated, the controller 96 signals the remaining switching devices to direct energy to the required components of the drivetrain for the selected operating mode. For example, when the selected operating mode includes one of an engine 14 starting mode or a charging mode for charging the first energy storage device 40, the controller 96 signals to position the first switching device 62 into the first closed state, thereby connecting the first energy storage device 40 with the starter mechanism and/or motor generator. When the selected operating mode does not include one of the engine 14 starting mode or the charging mode for charging the first energy storage device 40, the controller 96 signals to position the first switching device 62 into the first open state to electrically disconnect the first energy storage device 40 from the motor-generator. In order to provide power to the auxiliary electric system when the second energy storage device 42 is the unavailable energy storage device, the controller 96 powers the auxiliary electric system with power from either the motor-generator, or from the first energy storage device 40. In order to power the auxiliary electric system with power from the motor-generator, the controller 96 signals to position the third switching device 64 into the third closed state and position the fourth switching device 110 into the fourth open state, thereby isolating the first energy storage device 40 from the auxiliary electric system and connecting the motor-generator to the auxiliary electric system. In order to power the auxiliary electric system with power from the first energy storage device 40, the control signals to position the third switching device 64 into the third open state and position the fourth switching device 110 into the fourth closed state, thereby connecting the first energy storage device 40 and the auxiliary electric system, and isolating the auxiliary electric system from the motor-generator.

Additionally, the architecture of the powertrain 12F, 12G, 12H described above allows for the second energy storage device 42 to charge the first energy storage device 40. For example, if the state of charge of the first energy storage device 40 is below a threshold value required to start the engine 14, and if the temperature of the second energy storage device 42 is below a pre-defined value that would render the second energy storage device 42 unable to provide sufficient power to start the engine 14, the first switching device 62 and the second switching device 68 may be positioned into the first closed state and the second closed state respectively, for a period of time, to allow the second energy storage device 42 time to trickle charge the first energy storage device 40. Once the first energy storage device 40 is charged to a state of charge sufficient to provide power to start the engine 14, the controller 96 may position the switching devices into their appropriate position for the selected starting mode.

The different operating modes and the position of the first switching device 62, the second switching device 68, and the third switching device 64 are shown below. Additionally, the tables show the position of a first actuator and a second actuator of the starter mechanism for operating the starter mechanism, and a position of the motor/generator clutch 70. The first actuator and the second actuator may include, for example, the linear actuators 92A, and 92B shown in FIGS. 1 and 3 and described above with reference to their respective embodiment. Alternatively, the first actuator and the second actuator may be considered as a single actuator for the purposes of controlling the embodiment of the powertrain 12G shown in FIG. 2. Within the tables below, the first switching device 62 is represented by the column labeled S1, the second switching device 68 is represented by the column labeled S2, the third switching device 64 is represented by the column labeled S3, the first actuator is represented by the column labeled A1, the second actuator is represented by the column labeled A2, and the motor/generator clutch 70 is represented by the column labeled A3. Within the tables below, a "0" denotes an open state in which electrical communication is disconnected and/or the actuator is not engaged, and a "1" denotes a closed state in which electrical communication is connected and/or the actuator is engaged. The row labeled "normal operation" provides the standard operating positions for that specific operating mode when both the first energy storage device 40 and the second energy storage device 42 are available to provide energy to the system as intended. The row labeled "ESS1 NA" provides the operating positions for that specific operating mode when the first energy storage device 40 is unavailable, i.e., faulty. The row labeled "ESS2 NA" provides the operating positions for that specific operating mode when the second energy storage device 42 is unavailable, i.e., faulty.

The conditions and/or requirements of the powertrain 12F, 12G, 12H necessary to enter/exit the specific operating modes shown in the tables below are provided in the column labeled "Conditions to Enter/Exit". If the controller 96 determines that these conditions are satisfied, the controller 96 signals the various switching devices and actuators into their respective positions as indicted in the tables below.

| Engine_Off | | | | | | |
| --- | --- | --- | --- | --- | --- | --- |
| | A1 | A2 | A3 | S1 | S2 | S3 | Conditions to Enter/Exit |
| Normal Operation | 0 | 0 | 0 | 0 | 0 | 0 | Vehicle OFF |
| ESS1 NA | 0 | 0 | 0 | 0 | 0 | 0 | |
| ESS2 NA | 0 | 0 | 0 | 0 | 0 | 0 | |

When in the Engine_Off mode, the first switching device S1 (62), the second switching device S2 (68), the third switching device S3 (64), the first actuator A1 (92A), the second actuator A2 (92B), and the third actuator A3 (70) are kept off so that there will be no current draw from either the first energy storage device 40 or the second energy storage device 42.

| Engine_Idle_Off_1 | | | | | | |
|---|---|---|---|---|---|---|
| | A1 | A2 | A3 | S1 | S2 | S3 | Conditions to Enter/Exit |
| Normal Operation | 1 | 1 | 0 | 1 | 0 | 1 | SOC1 > ESS1_Discharge_LowerLimit |
| ESS2 NA | 1 | 1 | 0 | 1 | 0 | 1 | |

When in the Engine_Idle_Off_1 mode, the first actuator A1 (92A) and the second actuator A2 (92B) are kept engaged so that the engine 14 may be started by the motor-generator 38 when a key is turned to the RUN position. The auxiliary electric system 56 is powered by the first energy storage device 40, depending on the state of charge of the first energy storage device 40. The Engine_Idle_Off_1 mode is available only when the first energy storage device 40 is available to supply power.

| Engine_Idle_Off_2 | | | | | | |
|---|---|---|---|---|---|---|
| | A1 | A2 | A3 | S1 | S2 | S3 | Conditions to Enter/Exit |
| Normal Operation | 1 | 1 | 0 | 0 | 1 | 1 | SOC1 < ESS1_Discharge_LowerLimit (And) |
| ESS1 NA | 1 | 1 | 0 | 0 | 1 | 1 | SOC2 > ESS2_Discharge_LowerLimit |

When in the Engine_Idle_Off_2 mode, the first actuator A1 (92A) and the second actuator A2 (92B) are kept engaged so that the engine 14 may be started by the motor-generator 38 when a key is turned to the RUN position. The auxiliary electric system 56 is powered by the second energy storage device 42, depending on the state of charge of the second energy storage device 42. The Engine_Idle_Off_2 mode is available only when the second energy storage device 42 is available to supply power.

| Key_Start_1 | | | | | | |
|---|---|---|---|---|---|---|
| | A1 | A2 | A3 | S1 | S2 | S3 | Conditions to Enter/Exit |
| Normal Operation | 1 | 1 | 0 | 0 | 1 | 1 | Temperature < Threshold_ColdCrank |
| ESS1 NA | 1 | 1 | 0 | 0 | 1 | 1 | |

In the Key_Start_1 mode, when the key is turned to the RUN position, and when the ambient temperature is less than the Threshold_ColdCrank temperature, the engine 14 is cranked using the motor-generator 38 with energy supplied from the second energy storage device 42. The Key-Start_1 mode is available only when the second energy storage device 42 is available.

| Key_Start_2 | | | | | | |
|---|---|---|---|---|---|---|
| | A1 | A2 | A3 | S1 | S2 | S3 | Conditions to Enter/Exit |
| Normal Operation | 1 | 1 | 0 | 1 | 0 | 1 | Temperature > Threshold_ColdCrank (And) |
| ESS2 NA | 1 | 1 | 0 | 1 | 0 | 1 | SOC1 > ESS1_ColdCrank_LowerLimit |

In the Key_Start_2 mode, when the key is turned to the RUN position, the ambient temperature is greater than the Threshold_ColdCrank temperature, and when the state of charge fo the first energy storage device 40 is greater than the ESS1_ColdCrank_LowerLimit, the engine 14 is cranked using the motor-generator 38 with energy supplied from the first energy storage device 40. The Key-Start_2 mode is available only when the first energy storage device 40 is available.

| Auto_Start_1 | | | | | | |
|---|---|---|---|---|---|---|
| | A1 | A2 | A3 | S1 | S2 | S3 | Conditions to Enter/Exit |
| Normal Operation | 1 | 1 | 0 | 1 | 0 | 0 | SOC1 > ESS1_AutoStart_LowerLimit (And) Temperature < AutoStart_Temp_Limit |

In the Auto-Start_1 mode, when the ambient temperature is less than the AutoStart_Temp_Limit, and when the state of charge of the first energy storage device 40 is greater than the ESS1_AutoStart_LowerLimit, the engine 14 is restarted using the motor-generator 38 through the crankshaft 22, by engaging the first actuator A1 (92A) and the second actuator A2 (92B). The motor-generator 38 is supplied with power from the first energy storage device 40. Auto-Start_1 mode is available only when the first energy storage device 40 and the second energy storage device 42 are available.

| Auto_Start_2 | | | | | | |
|---|---|---|---|---|---|---|
| | A1 | A2 | A3 | S1 | S2 | S3 | Conditions to Enter/Exit |
| Normal Operation | 1 | 1 | 0 | 0 | 1 | 0 | SOC1 < ESS1_AutoStart_LowerLimit (And) SOC2 > ESS2_AutoStart_LowerLimit (And) Temperature < AutoStart_Temp_Limit |

In the Auto-Start_2 mode, when the ambient temperature is less than the AutoStart_Temp_Limit, the state of charge of the first energy storage device 40 is less than the ESS1_AutoStart_LowerLimit, and the state of charge of the second energy storage device 42 is greater than the ESS2_AutoStart_LowerLimit, the engine 14 is restarted using the motor-generator 38 through the crankshaft 22, by engaging the first actuator A1 (92A) and the second actuator A2 (92B). The motor-generator 38 is supplied with power from the second energy storage device 42. Auto-Start_2 mode is available only when the first energy storage device 40 and the second energy storage device 42 are available.

| Auto_Start_3 | | | | | | |
|---|---|---|---|---|---|---|
| | A1 | A2 | A3 | S1 | S2 | S3 | Conditions to Enter/Exit |
| Normal Operation | 0 | 0 | 1 | 1 | 0 | 0 | SOC1 > ESS1_AutoStart_LowerLimit (And) Temperature > AutoStart_Temp_Limit |

In the Auto-Start_3 mode, when the ambient temperature is greater than the AutoStart_Temp_Limit, and the state of charge of the first energy storage device 40 is greater than the ESS1_AutoStart_LowerLimit, the engine 14 is restarted using the motor-generator 38 through the endless rotatable device 58, by engaging the third actuator A3 (motor/generator clutch 70). The motor-generator 38 is supplied with power from the first energy storage device 40. Auto-Start_3 mode is available only when the first energy storage device 40 and the second energy storage device 42 are available.

| Auto_Start_4 | | | | | | |
|---|---|---|---|---|---|---|
| | A1 | A2 | A3 | S1 | S2 | S3 | Conditions to Enter/Exit |
| Normal Operation | 0 | 0 | 1 | 0 | 1 | 0 | SOC1 < ESS1_AutoStart_LowerLimit (And) SOC2 > ESS2_AutoStart_LowerLimit (And) Temperature > AutoStart_Temp_Limit |

In the Auto-Start_4 mode, when the ambient temperature is greater than the AutoStart_Temp_Limit, the state of charge of the first energy storage device 40 is less than the ESS1_AutoStart_LowerLimit, and the state of charge of the second energy storage device 42 is greater than the ESS2_AutoStart_LowerLimit, the engine 14 is restarted using the motor-generator 38 through the endless rotatable device 58, by engaging the third actuator A3 (motor/generator clutch 70). The motor-generator 38 is supplied with power from the second energy storage device 42. Auto-Start_4 mode is available only when the first energy storage device 40 and the second energy storage device 42 are available.

| Torque_Assist | | | | | | |
|---|---|---|---|---|---|---|
| | A1 | A2 | A3 | S1 | S2 | S3 | Conditions to Enter/Exit |
| Normal Operation | 0 | 0 | 1 | 1 | 0 | 1 | SOC1 > Threshold_TorqueAssist |
| ESS2 NA | 0 | 0 | 1 | 1 | 0 | 1 | |

In the Torque_Assist mode, when the state of charge of the first energy storage device 40 is greater than the Threshold_TorqueAssist charge level, engine torque assist is provided by the motor-generator 38 during vehicle acceleration using energy supplied by the first energy storage device 40. The Torque_Assist mode is applicable only when the first energy storage device 40 is available.

| Regen_1 | | | | | | |
|---|---|---|---|---|---|---|
| | A1 | A2 | A3 | S1 | S2 | S3 | Conditions to Enter/Exit |
| Normal Operation | 0 | 0 | 1 | 1 | 1 | 1 | SOC1 < Regen_UpperLimit_ESS1 (And) SOC2 < Regen_UpperLimit_ESS2 (And) $|V_{ESS1} - V_{ESS2}| < \epsilon$ |
| ESS2 NA | 0 | 0 | 1 | 1 | 0 | 1 | |

When in the Regen_1 mode, during vehicle coasting, the regenerative energy is captured by charging the first energy storage device 40 and the second energy storage device 42 with the motor-generator 38. The motor-generator 38 operates in a generating mode with maximum voltage limit. The Regen_1 mode is applicable only when the state of charge of the first energy storage device 40 and the second energy storage device 42 are below the Regen_UpperLimit_ESS1 and Regen_UpperLimit_ESS2 respectively, and when the voltage difference between the first energy storage device 40 and the second energy storage device 42 is less than a difference limit. The Regen_1 mode is not applicable when the first energy storage device 40 is not available.

| Regen_2 | | | | | | |
|---|---|---|---|---|---|---|
| | A1 | A2 | A3 | S1 | S2 | S3 | Conditions to Enter/Exit |
| Normal Operation | 0 | 0 | 1 | 1 | 0 | 1 | SOC1 < Regen_UpperLimit_ESS1 (And) |
| ESS2 NA | 0 | 0 | 1 | 1 | 0 | 1 | SOC2 < Regen_UpperLimit_ESS2 (And) |
| | | | | | | | $|V_{ESS1} - V_{ESS2}| > \epsilon$ |

When in the Regen_2 mode, during vehicle coasting, the regenerative energy is captured by charging the first energy storage device 40 with the motor-generator 38. The motor-generator 38 operates in a generating mode with maximum voltage limit. The Regen_2 mode is applicable only when the state of charge of the first energy storage device 40 and the second energy storage device 42 are below the Regen_UpperLimit_ESS1 and Regen_UpperLimit_ESS2 respectively, and when the voltage difference between the first energy storage device 40 and the second energy storage device 42 is greater than a difference limit. The Regen_2 mode is not applicable when the first energy storage device 40 is not available.

| Regen_3 | | | | | | |
|---|---|---|---|---|---|---|
| | A1 | A2 | A3 | S1 | S2 | S3 | Conditions to Enter/Exit |
| Normal Operation | 0 | 0 | 1 | 0 | 1 | 1 | SOC1 > Regen_UpperLimit_ESS1 (And) |
| ESS1 NA | 0 | 0 | 1 | 0 | 1 | 1 | SOC2 < Regen_UpperLimit_ESS2 |

When in the Regen_3 mode, during vehicle coasting, the regenerative energy is captured by charging the second energy storage device 42 with the motor-generator 38. The motor-generator 38 operates in a generating mode with maximum voltage limit. The Regen_3 mode is applicable only when the state of charge of the first energy storage device 40 is greater than the Regen_UpperLimit_ESS1, and when the state of charge of the second energy storage device 40 is less than the Regen_UpperLimit_ESS2. The Regen_3 mode is not applicable when the second energy storage device 42 is not available.

| Regen_4 | | | | | | |
|---|---|---|---|---|---|---|
| | A1 | A2 | A3 | S1 | S2 | S3 | Conditions to Enter/Exit |
| Normal Operation | 0 | 0 | 1 | 1 | 0 | 1 | SOC1 < Regen_UpperLimit_ESS1 (And) |
| ESS2 NA | 0 | 0 | 1 | 0 | 0 | 1 | SOC2 >= Regen_UpperLimit_ESS2 |

When in the Regen_4 mode, during vehicle coasting, the regenerative energy is captured by charging the first energy storage device 40 with the motor-generator 38. The motor-generator 38 operates in a generating mode with maximum voltage limit. The Regen_4 mode is applicable only when the state of charge of the first energy storage device 40 is less than the Regen_UpperLimit_ESS1, and when the state of charge of the second energy storage device 40 is greater than the Regen_UpperLimit_ESS2. The Regen_4 mode is not applicable when the first energy storage device 40 is not available.

| Regen_5 | | | | | | |
|---|---|---|---|---|---|---|
| | A1 | A2 | A3 | S1 | S2 | S3 | Conditions to Enter/Exit |
| Normal Operation | 0 | 0 | 1 | 0 | 0 | 1 | SOC1 > Regen_UpperLimit_ESS1 (And) |
| ESS1 NA | 0 | 0 | 1 | 0 | 0 | 1 | SOC2 >= Regen_UpperLimit_ESS2 |

In the Regen_5 mode, when the state of charge of the first energy storage device 40 is greater than the Regen_Upper-Limit_ESS1, and when the state of charge of the second energy storage device 40 is greater than the Regen_Upper-Limit_ESS2, the first energy storage device 40 and the second energy storage device 42 cannot be charged any further during vehicle coasting. In the Regen_5 mode, the regenerative energy is used for supplying energy to the auxiliary electric system 56 through the motor-generator 38.

| Auto_Stop_1 | | | | | | |
|---|---|---|---|---|---|---|
| | A1 | A2 | A3 | S1 | S2 | S3 | Conditions to Enter/Exit |
| Normal Operation | 0 | 0 | 0 | 1 | 0 | 1 | SOC1 > ESS1_Discharge_LowerLimit |

When in the Auto_Stop_1 mode, the first energy storage device 40 supplies the accessory load, provided the state of charge of the first energy storage device 40 is greater than the ESS1_Discharge_LowerLimit. The Auto_Stop_1 mode is applicable only when both the first energy storage device 40 and the second energy storage device 42 are available.

| Auto_Stop_2 | | | | | | |
|---|---|---|---|---|---|---|
| | A1 | A2 | A3 | S1 | S2 | S3 | Conditions to Enter/Exit |
| Normal Operation | 0 | 0 | 0 | 0 | 1 | 1 | SOC1 < ESS1_Discharge_LowerLimit<br>SOC2 > ESS2_Discharge_LowerLimit |

When in the Auto_Stop_2 mode, the second energy storage device 42 supplies the accessory load, provided the state of charge of the first energy storage device 40 is greater than the ESS1_Discharge_LowerLimit, and the state of charge of the first energy storage device 40 has fallen below the ESS1_ Discharge_LowerLimit. The Auto_Stop_2 mode is applicable only when both the first energy storage device 40 and the second energy storage device 42 are available.

| Exit_Auto_Stop | | | | | | |
|---|---|---|---|---|---|---|
| | A1 | A2 | A3 | S1 | S2 | S3 | Conditions to Enter/Exit |
| Normal Operation | 0 | 0 | 1 | 1 | 1 | 1 | SOC1 < ESS1_Discharge_LowerLimit<br>SOC2 < ESS2_Discharge_LowerLimit |

In the Exit_Auto_Stop mode, when the state of charge of the first energy storage device 40 is less than the ESS1_Discharge_LowerLimit, and the state of charge of the second energy storage device 42 is less than the ESS2_Discharge_LowerLimit, then either the Auto_Stop_1 mode or the Auto_Stop_2 mode are exited. The Exit_Auto_Stop mode is applicable only when both the first energy storage device 40 and the second energy storage device 42 are available.

| i-Sailing_1 | | | | | | |
|---|---|---|---|---|---|---|
| | A1 | A2 | A3 | S1 | S2 | S3 | Conditions to Enter/Exit |
| Normal Operation | 0 | 0 | 1 | 1 | 0 | 1 | SOC1 > ESS1_Discharge_LowerLimit |

When in the i-Sailing_1 mode, the first energy storage device 40 supplies the accessory load to the auxiliary electric system 56, provided the state of charge of the first energy storage system 40 is greater than the ESS1_Discharge_LowerLimit. The i-Sailing_1 mode is applicable only when both the first energy storage device 40 and the second energy storage device 42 are available.

| i-Sailing_2 | | | | | | |
|---|---|---|---|---|---|---|
| | A1 | A2 | A3 | S1 | S2 | S3 | Conditions to Enter/Exit |
| Normal Operation | 0 | 0 | 1 | 0 | 1 | 1 | SOC1 < ESS1_Discharge_LowerLimit; SOC2 > ESS2_Discharge_LowerLimit |

When in the i-Sailing_2 mode, the second energy storage device 40 supplies the accessory load to the auxiliary electric system 56, when the state of charge of the first energy storage system 40 is less than the ESS1_Discharge_LowerLimit, and the state of charge of the second energy storage device 42 is greater than the ESS2_Discharge_LowerLimit. The i-Sailing_2 mode is applicable only when both the first energy storage device 40 and the second energy storage device 42 are available.

| Exit_i-Sailing | | | | | | |
|---|---|---|---|---|---|---|
| | A1 | A2 | A3 | S1 | S2 | S3 | Conditions to Enter/Exit |
| Normal Operation | 0 | 0 | 1 | 1 | 1 | 1 | SOC1 < ESS1_Discharge_LowerLimit; SOC2 < ESS2_Discharge_LowerLimit |

In the Exit_i-Sailing mode, when the state of charge of the first energy storage device 40 is less than the ESS1_Discharge_LowerLimit, and the state of charge of the second energy storage device 42 is less than the ESS2_Discharge_LowerLimit, then either the i-Sailing_1 mode or the i-Sailing_2 mode are exited. The Exit_i-Sailing mode is applicable only when both the first energy storage device 40 and the second energy storage device 42 are available.

| Sailing_Fault_Tolerance_1 | | | | | | |
|---|---|---|---|---|---|---|
| | A1 | A2 | A3 | S1 | S2 | S3 | Conditions to Enter/Exit |
| Normal Operation | 1 | 1 | 1 | 0 | 1 | 0 | ESS2 Failed |

The Sailing_Fault_Tolerance_1 mode is applicable only when both the first energy storage device 40 and the second energy storage device 42 are available.

| Sailing_Fault_Tolerance_2 | | | | | | |
|---|---|---|---|---|---|---|
| | A1 | A2 | A3 | S1 | S2 | S3 | Conditions to Enter/Exit |
| Normal Operation | 1 | 1 | 0 | 0 | 0 | 1 | ESS1 Failed |

The Sailing_Fault_Tolerance_2 mode is applicable only when both the first energy storage device 40 and the second energy storage device 42 are available.

| Recharge | | | | | | |
|---|---|---|---|---|---|---|
| | A1 | A2 | A3 | S1 | S2 | S3 | Conditions to Enter/Exit |
| Normal Operation | 0 | 0 | 1 | 1 | 1 | 1 | SOC1 < ESS1_Min_SOC_Limit; SOC2 < ESS2_Min_SOC_Limit |

In the Recharge mode, when the state of charge of the first energy storage device 40 is less than ESS1_Min_SOC_Limit, and the state of charge of the second energy storage device 42 is less than ESS2_Min_SOC_Limit, then the first switching device S1 (62) and the second switching device S2 (68) are closed simultaneously so that both the first energy storage device 40 and the second energy storage device 42 are charged by the motor-generator 38 operating in a generating mode.

| Change-of-Mind_Gear | | | | | | |
|---|---|---|---|---|---|---|
| | A1 | A2 | A3 | S1 | S2 | S3 | Conditions to Enter/Exit |
| Normal Operation | 1 | 1 | 0 | 0 | 1 | 0 | Restart through starter mechanism |

The Change-of-Mind Gear mode is applicable only when both the first energy storage device 40 and the second energy storage device 42 are available.

| Change-of-Mind_Belt | | | | | | |
|---|---|---|---|---|---|---|
| | A1 | A2 | A3 | S1 | S2 | S3 | Conditions to Enter/Exit |
| Normal Operation | 0 | 0 | 1 | 0 | 1 | 0 | Restart through endless rotatable device |

The Change-of-Mind Belt mode is applicable only when both the first energy storage device 40 and the second energy storage device 42 are available.

| Jump_Charging | | | | | | |
|---|---|---|---|---|---|---|
| | A1 | A2 | A3 | S1 | S2 | S3 | Conditions to Enter/Exit |
| Normal Operation | 0 | 0 | 0 | 1 | 1 | 0 | SOC1 < ESS1_Start_LowerLimit (And) Temperature < Start_LowerLimit_Temp |

In the Jump_Charging mode, when the state of charge of the first energy storage device 40 is less than ESS1_Start_LowerLimit, and the ambient temperature is less than the Start_LowerLimt_Temp threshold, then neither the first energy storage device 40 nor the second energy storage device 42 will be able to start the engine 14 successfully. Under the Jump_Charging mode, the first switching device S1 (62) and the second switching device S2 (28) are closed for a pre-determined length of time to allow the first energy storage device 40 to charge the second energy storage device 42 to a sufficient level to enable starting the engine 14. The engine 14 is started by the motor-generator 38 using energy from the second energy storage device 42. The Jump_Charging mode is applicable only when both the first energy storage device 40 and the second energy storage device 42 are available.

Within the above tables, the following terms noted in the "Conditions to Enter/Exit" column of the respective tables are defined as follows below.

SOC1=the existing state of charge of the first energy storage device 40.

SOC2=the existing state of charge of the second energy storage device 42.

ESS1_Discharge_LowerLimit=Lower limit on the state of charge of the first energy storage device 40 for discharging.

ESS2_Discharge_LowerLimit=Lower limit on the state of charge of the second energy storage device 42 for discharging.

Temperature=Ambient temperature.

Threshold_ColdCrank=Cold cranking temperature threshold limit below which the first energy storage device 40 will not be able to crank the engine 14 successfully.

ESS1_ColdCrank_LowerLimit=Lower limit on the state of charge of the first energy storage device 40, below which the first energy storage device 40 will not be able to cold crank the engine 14 successfully.

ESS1_AutoStart_LowerLimit=Lower limit on the state of charge of the first energy storage device 40, below which the first energy storage device 40 will not be able to crank the engine 14 successfully after an auto-stop event.

ESS2_AutoStart_LowerLimit=Lower limit on the state of charge of the second energy storage device 42, below which the second energy storage device 42 will not be able to crank the engine 14 successfully after an auto-stop event.

Threshold_TorqueAssist=Lower limit on the state of charge of the first energy storage device 40, below which the first energy storage device 40 will not be able to provide torque assist to the engine 14.

Regen_UpperLimit_ESS1=Charging limit on the state of charge of the first energy storage device 40 during a regen event.

Regen_UpperLimit_ESS2=Charging limit on the state of charge of the second energy storage device 42 during a regen event.

$V_{ESS1}$=Internal voltage of the first energy storage device 40.

$V_{ESS2}$=Internal voltage of the second energy storage device 42.

$\epsilon$=Threshold on the difference between internal voltages of the first energy storage device 40 and the second energy storage device 42 when connected in parallel.

ESS2_Failed=Internal condition and/or fault in the second energy storage device that renders the second energy storage device unavailable.

ESS1_Failed=Internal condition and/or fault in the first energy storage device that renders the first energy storage device unavailable.

ESS1_Min_SOC_Limit=Minimum state of charge level to be maintained on the first energy storage device 40 under all conditions.

ESS2_Min_SOC_Limit=Minimum state of charge level to be maintained on the second energy storage device 42 under all conditions.

Restart through starter mechanism=After an auto-stop event, restarting the engine 14 through the starter mechanism 60. This is achieved by engaging the first solenoid A1 and the second solenoid A2. In systems employing a separate starter unit (separate motor from the motor-generator 38) the engine 14 is started by the starter motor and the first and second solenoids A1, A2 are duel tandem solenoids in the starter motor. In systems employing only the motor-generator 38 (coupled to the crankshaft 22 via the starter mechanism 60), the engine 14 is started by the motor-generator 38, and the first and second solenoids A1, A2 are part of the starter mechanism 60.

Restart through belt=After an auto-stop event, restarting the engine 14 through the endless rotatable device 58, by engaging the motor/generator clutch 70.

SOC1<ESS1_Start_LowerLimit=Minimum state of charge level to be maintained on the first energy storage device 40 under all conditions.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A powertrain for a vehicle, the powertrain comprising:
   an engine;
   a motor-generator coupleable to the engine;
   a starter mechanism coupleable to the engine;
   an auxiliary electric system in electrical communication with the motor-generator;

a first energy storage device disposed in a parallel electrical relationship with the motor-generator and the auxiliary electric system;

a first switching device selectively transitionable between a first open state to electrically disconnect the first energy storage device from at least one of the motor-generator and the auxiliary electric system, and a first closed state to electrically connect the first energy storage device to at least one of the motor-generator and the auxiliary electric system, with electrical communication between the motor-generator and the auxiliary electric system being independent of the first switching device being in the first open state and the first closed state;

a second energy storage device disposed in a parallel electrical relationship with the first energy storage device, the motor-generator and the auxiliary electric system;

a second switching device selectively transitionable between a second open state to electrically disconnect the second energy storage device from at least one of the motor-generator and the auxiliary electric system, and a second closed state to electrically connect the second energy storage device to at least one of the motor-generator and the auxiliary electric system, with electrical communication between the motor-generator and the auxiliary electric system being independent of the second switching device being in the second open and closed states a third switching device disposed in a serial electrical relationship with the motor-generator and the auxiliary electric system, disposed downstream from the motor-generator, the first energy storage device, and the second energy storage device along an electrical bus, and wherein the third switching device is disposed upstream from the auxiliary electric system along the electrical bus; and wherein the third switching device is selectively transitionable between a third open state to electrically disconnect the auxiliary electric system from at least one of the motor-generator, the first energy storage device and the second energy storage device, and a third closed state to electrically connect the auxiliary electric system to at least one of the motor-generator, the first energy storage device, and the second energy storage device.

2. The powertrain set forth in claim 1 wherein the first energy storage device is disposed between the electrical bus and an electrical ground, and the first switching device is disposed between the first energy storage device and the electrical bus such that the first energy storage device is in direct electrical communication with the electrical bus when the first switching device is in the first closed state.

3. The powertrain set forth in claim 2 wherein the second energy storage device is disposed between the electrical bus and the electrical ground, and the second switching device is disposed between the second energy storage device and the electrical bus such that the second energy storage device is in direct electrical communication with the electrical bus when the second switching device is in the second closed state.

4. The powertrain set forth in claim 1 wherein the first energy storage device is a high-voltage energy storage device, and the second energy storage device is a low-voltage energy storage device that is in electrical communication with the auxiliary electric system.

5. The powertrain set forth in claim 1 wherein the first energy storage device and the second energy storage device each operate at a similar, nominal voltage.

6. The powertrain set forth in claim 5 wherein the first energy storage device and the second energy storage device each operate at a nominal 12 volts.

7. The powertrain set forth in claim 3 further comprising a fourth switching device selectively transitionable between a fourth open state to electrically disconnect the first energy storage device from the auxiliary electric system, and a fourth closed state to electrically connect the first energy storage device to the auxiliary electric system, such that electrical communication between the first energy storage device and the auxiliary electric system through the fourth switching device is independent of the first switching device being in the first open state and the first closed state.

8. The powertrain set forth in claim 7 wherein the fourth switching device is electrically connected to the first energy storage device at a first electrical connection disposed between the first energy storage device and the first switching device.

9. The powertrain set forth in claim 3 further comprising a fifth switching device selectively transitionable between a fifth open state to electrically disconnect the second energy storage device from the auxiliary electric system, and a fifth closed state to electrically connect the second energy storage device to the auxiliary electric system, such that electrical communication between the second energy storage device and the auxiliary electric system through the fifth switching device is independent of the second switching device being in the second open state and the second closed state.

10. The powertrain set forth in claim 7 wherein the fifth switching device is electrically connected to the second energy storage device at a second electrical connection disposed between the second energy storage device and the second switching device.

11. A powertrain for a vehicle, the powertrain comprising:
an engine;
a motor-generator coupleable to the engine;
a starter motor coupleable to the engine;
an auxiliary electric system in electrical communication with the motor-generator;
a first energy storage device disposed in a parallel electrical relationship with the motor-generator, the starter motor, and the auxiliary electric system;
a first switching device selectively transitionable between a first open state to electrically disconnect the first energy storage device from at least one of the motor-generator, the starter motor, and the auxiliary electric system, and a first closed state to electrically connect the first energy storage device to at least one of the motor-generator, the starter motor and the auxiliary electric system, with electrical communication between the motor-generator and the auxiliary electric system being independent of the first switching device being in the first open state and the first closed state;
a second energy storage device disposed in a parallel electrical relationship with the first energy storage device, the motor-generator, the starter motor, and the auxiliary electric system;
a second switching device selectively transitionable between a second open state to electrically disconnect the second energy storage device from at least one of the motor-generator, the starter motor, and the auxiliary electric system, and a second closed state to electrically connect the second energy storage device to at least one of the motor-generator, the starter motor, and the auxiliary electric system, with electrical communication between the motor-generator and the auxiliary electric system being independent of the second switching device being in the second open and closed states;
a third switching device disposed in a serial electrical relationship with the motor-generator and the auxiliary electric system, disposed downstream from the motor-generator, the first energy storage device, and the second energy storage device along an electrical bus, and wherein the third switching device is disposed upstream from the auxiliary electric system along the electrical bus; and wherein the third switching device is selectively transitionable between a third open state to electrically disconnect the auxiliary electric system from at least one of the motor-generator, the first energy storage device and the second energy storage device, and a third closed state to electrically connect the auxiliary electric system to at least one of the motor-generator, the first energy storage device, and the second energy storage device.

12. The powertrain set forth in claim 11 wherein the first energy storage device is disposed between the electrical bus and an electrical ground, and the first switching device is disposed between the first energy storage device and the electrical bus such that the first energy storage device is in direct electrical communication with the electrical bus when the first switching device is in the first closed state.

13. The powertrain set forth in claim 12 wherein the second energy storage device is disposed between the electrical bus and the electrical ground, and the second switching device is disposed between the second energy storage device and the electrical bus such that the second energy storage device is in direct electrical communication with the electrical bus when the second switching device is in the second closed state.

14. The powertrain set forth in claim 11 wherein the first energy storage device is a high-voltage energy storage device, and the second energy storage device is a low-voltage energy storage device that is in electrical communication with the auxiliary electric system.

15. The powertrain set forth in claim 11 wherein the first energy storage device and the second energy storage device each operate at a similar, nominal voltage.

16. The powertrain set forth in claim 15 wherein the first energy storage device and the second energy storage device each operate at a nominal 12 volts.

17. The powertrain set forth in claim 13 further comprising a fourth switching device selectively transitionable between a fourth open state to electrically disconnect the first energy storage device from the auxiliary electric system, and a fourth closed state to electrically connect the first energy storage device to the auxiliary electric system, such that electrical communication between the first energy storage device and the auxiliary electric system through the fourth switching device is independent of the first switching device being in the first open state and the first closed state.

18. The powertrain set forth in claim 17 wherein the fourth switching device is electrically connected to the first energy storage device at a first electrical connection disposed between the first energy storage device and the first switching device.

19. The powertrain set forth in claim 13 further comprising a fifth switching device selectively transitionable between a fifth open state to electrically disconnect the second energy storage device from the auxiliary electric system, and a fifth closed state to electrically connect the second energy storage device to the auxiliary electric system, such that electrical communication between the second energy storage device and the auxiliary electric system through the fifth switching device is independent of the second switching device being in the second open state and the second closed state.

20. The powertrain set forth in claim 17 wherein the fifth switching device is electrically connected to the second energy storage device at a second electrical connection disposed between the second energy storage device and the second switching device.

* * * * *